US007894224B2

(12) United States Patent
Ulrich et al.

(10) Patent No.: US 7,894,224 B2
(45) Date of Patent: Feb. 22, 2011

(54) VOLTAGE DRIVE SYSTEM WITH HYSTERETIC CURRENT CONTROL AND METHOD OF OPERATING THE SAME

(75) Inventors: James A Ulrich, Hartland, WI (US); Ashish R Bendre, Shorewood, WI (US)

(73) Assignee: DRS Power & Technologies, Inc., Milwaukee, WI (US)

( * ) Notice: Subject to any disclaimer, the term of this patent is extended or adjusted under 35 U.S.C. 154(b) by 303 days.

(21) Appl. No.: 12/246,852

(22) Filed: Oct. 7, 2008

(65) Prior Publication Data

US 2010/0085789 A1    Apr. 8, 2010

(51) Int. Cl.
H02M 3/335    (2006.01)
H02M 7/68    (2006.01)

(52) U.S. Cl. .......................... 363/132; 363/95; 363/97; 363/98; 363/131; 363/16; 363/17

(58) Field of Classification Search .................. 363/16, 363/17, 95, 97, 98, 131, 132
See application file for complete search history.

(56) References Cited

U.S. PATENT DOCUMENTS

| | | | | |
|---|---|---|---|---|
| 5,214,575 A | * | 5/1993 | Sugishima et al. | 363/37 |
| 5,625,545 A | | 4/1997 | Hammond | |
| 5,880,947 A | * | 3/1999 | Imanaka et al. | 363/89 |
| 5,933,339 A | | 8/1999 | Duba et al. | |
| 6,009,003 A | * | 12/1999 | Yeo | 363/37 |
| 6,697,271 B2 | | 2/2004 | Corzine | |
| 6,922,318 B2 | * | 7/2005 | Matsumoto et al. | 361/42 |
| 7,075,267 B1 | | 7/2006 | Cheng | |
| 2007/0030705 A1 | * | 2/2007 | Yamamoto et al. | 363/41 |
| 2008/0123381 A1 | * | 5/2008 | Konishi et al. | 363/95 |
| 2009/0231893 A1 | * | 9/2009 | Esmaili et al. | 363/79 |

OTHER PUBLICATIONS

"A Novel Double Hysteresis-Band Current Control for a Three-Level Voltage Source Inverter", Lafoz, et al., 2000 IEEE.
"Operation and Design of Multilevel Inverters", Corzine, University of Missouri, Rolla, Developed for the Office of Naval Research Dec. 2003, revised Jun. 2005.

* cited by examiner

*Primary Examiner*—Bao Q Vu
(74) *Attorney, Agent, or Firm*—SNR Denton US LLP

(57) ABSTRACT

A voltage drive system is provided having a plurality of modulators and a plurality of cascaded switching circuits which collectively generate a single-phase output signal to a load. Each modulator receives a phase current error and has an adder which generates a modulated phase current error based on the phase current error and based on a signal having a phase. For each respective modulator, the phase of the respective signal is different. Each respective modulator changes a respective gate input when the respective modulated phase current error changes from being within a predetermined current range to being outside of the predetermined current range. Each respective switching circuit receives the respective gate input and generates a respective output terminal voltage based on the respective gate input. The change in the respective gate input effectively causes a switching event of the respective switching circuit.

23 Claims, 13 Drawing Sheets

VOLTAGE DRIVE SYSTEM WITH HYSTERETIC CURRENT CONTROL AND METHOD OF OPERATING THE SAME

FIELD OF INVENTION

*The present invention generally relates to a voltage drive system. More particularly, the present invention relates to a voltage drive system employing an improved hysteretic current control technique.

Typically, variable frequency voltage drive systems are used to control variable speed, medium voltage motors to drive systems requiring 5 MW to 75 MW of power. These conventional voltage drive systems usually operate at medium voltages of 1.5 kV to 13.2 kV, as operation at low voltages leads to excessive currents and losses. While these drives can be manufactured using high voltage devices, the selection and availability of such devices is limited and they are severely lacking in switching speed. This limitation is significant, as the switching frequency determines the bandwidth of the voltage drive system, which in turn dictates the output waveform quality.

Certain conventional medium voltage drive systems (such as depicted in FIGS. 1-3) employ lower voltage devices with specialized connections between the devices. The low voltage devices in these conventional voltage drive systems (e.g., 100 in FIG. 1) are typically "H-bridges" (such as the H-bridge 200 shown in FIG. 2) that can be switched at faster rates, yielding an improvement in output waveform quality. However, the conventional voltage drive systems 100 typically employ a deterministic controller (e.g., 120 in FIG. 1) that switches the H-bridges at constant or regular time intervals based on a reference voltage input, resulting in a fixed switching rate regardless of the slew rate of the reference voltage input to the deterministic controller.

Conventional voltage drive systems 100 that employ a deterministic controller 120 to switch H-bridges in order to drive a three-phase load 101 will now be explained in further detail to illustrate the fixed switching rate problem and other problems with these conventional voltage drives. As shown in FIG. 1, a conventional voltage drive system 100 employing H-bridges $106A_1$-$106A_n$, $106B_1$-$106B_n$, and $106C_1$-$106C_n$ and a deterministic controller 120 to control the switching of the H-bridges also typically include an input transformer 102; phase output lines 104A, 104B, and 104C; current feedback circuits 108A, 108B, and 108C; an ac filter 110; a speed or voltage control loop circuit 114; a torque/flux controller 116; and a current regulator 118. The input transformer 102 includes a primary winding circuit 122 and secondary winding circuits $124A_1$-$124A_n$, $124B_1$-$124B_n$, and $124C_1$-$124C_n$. Each of the phase output lines 104A, 104B, and 104C are coupled to and driven by a respective number (n) of cascaded H-bridges $106A_1$-$106A_n$, $106B_1$-$106B_n$, and $106C_1$-$106C_n$. The output of each of the respective secondary winding circuits $124A_1$-$124A_n$, $124B_1$-$124B_n$, and $124C_1$-$124C_n$ is fed to a respective one of the H-bridges $106A_1$-$106A_n$, $106B_1$-$106B_n$, and $106C_1$-$106C_n$ (each of which is configured consistent with the H-bridge 200 in FIG. 2) as one of three single-phase power inputs 202a-202c.

A typical H-bridge 200 employed in conventional voltage drive systems 100 is shown in FIG. 2. The H-bridge 200 receives the three single-phase power inputs 202a-202c, which are rectified (via a rectifier 204) to produce a dc supply voltage that is then filtered by the capacitor 206. The filtered dc supply voltage serves as the supply voltage for the four power switches 208a-208d. Each of the power switches 208a-208d has a respective gate 210a-210d that is controlled by the deterministic controller 120 of the conventional voltage drive system 100.

Returning to FIG. 1, the gate inputs to the four gates 210a-210d of each H-bridge $106A_1$-$106A_n$, $106B_1$-$106B_n$, and $106C_1$-$106C_n$ are generated by the deterministic controller 120 using the limited fixed switching rate as further described below. First, the speed or voltage control loop circuit 114 generates a dc torque command and a dc flux command that are fed to the torque/flux regulator 116. The torque/flux regulator 116 then synthesizes current commands in the d, q reference frame based on the torque and flux commands. The current commands are input to the current regulator 118. The current regulator 118 also receives current feedback signals 126a, 126b, and 126c generated by current feedback circuits 108A, 108B, and 108C based on a respective phase output line 104A, 104B, and 104C. The current regulator 118 generates phase voltage references 128a, 128b, and 128c in the a, b, c reference frame based on the d, q current commands and the current feedback signals. The phase voltage references 128a, 128b, and 128c are typically sinusoidally varying at the desired output electrical frequency of the conventional voltage drive system 100.

The phase voltage references 128a, 128b, and 128c are input to the deterministic controller 120. In response to the phase voltage references 128a, 128b, and 128c, the deterministic controller 120 generates a plurality of sets of four gate inputs $130a_1$-$130a_n$, $130b_1$-$130b_n$, and $130c_1$-$130c_n$ to the H-bridges $106A_1$-$106A_n$, $106B_1$-$106B_n$, and $106C_1$-$106C_n$. As shown in FIG. 2, depending on which of the four power switches 108a-108d are gated active by the deterministic controller 120, the voltage between the output terminals 212 and 214 (also referred to herein as the output terminal voltage) of the respective H-bridge $106A_1$-$106A_n$, $106B_1$-$106B_n$, and $106C_1$-$106C_n$ may be either the supply voltage used to the power the power switches 108a-108d, the negative of the supply voltage, or zero.

Each group of the H-bridges $106A_1$-$106A_n$, $106B_1$-$106B_n$, and $106C_1$-$106C_n$ are cascaded; that is, their output terminals (e.g., 112 and 114 in FIG. 2) are electrically connected, such that the respective H-bridges $106A_1$-$106A_n$, $106B_1$-$106B_n$, and $106C_1$-$106C_n$ in each group collectively generate a single-phase output signal on the respective phase output lines 104A, 104B, and 104C. The H-bridges $106A_1$-$106A_n$, $106B_1$-$106B_n$, and $106C_1$-$106C_n$ are cascaded such that the voltages of the respective single-phase output signals are equal to the sum of the voltages between the output terminals 212 and 214 of the respective H-bridges $106A_1$-$106A_n$, $106B_1$-$106B_n$, and $106C_1$-$106C_n$. Thus, the timing of the gating of the H-bridge power switches by the deterministic controller 120 employed in conventional voltage drive systems 100 is important for synthesizing an output waveform at various frequencies.

The deterministic controller 120 typically employed in the conventional voltage drive system 100 implements a pulse width modulation ("PWM") technique in order to gate the four power switches 108a-108d of each H-bridge and control the voltages of the single-phase output signals generated by the H-bridge. More specifically, the deterministic controller 120 selectively switches the gate inputs $130a_1$-$130a_n$, $130b_1$-$130b_n$, and $130c_1$-$130c_n$ that are fed to the gates 210a-210d of each of the H-bridges $106A_1$-$106A_n$, $106B_1$-$106B_n$, and $106C_1$-$106C_n$ in order to cause a corresponding switching event for one or more of the power switches 108a-108d in each gated H-bridge $106A_1$-$106A_n$, $106B_1$-$106B_n$, and $106C_1$-$106C_n$. These switching events, in turn, cause the voltages between the output terminals 212 and 214 of the H-bridges $106A_1$-$106A_n$, $106B_1$-$106B_n$, and $106C_1$-$106C_n$ to change to a corresponding state (e.g., +supply voltage, −supply voltage, or zero voltage).

In order to provide acceptably low distortion output waveforms, the voltage waveforms of the single-phase output signals should be switched at a PWM frequency of 60 times the desired output frequency. To achieve this result, the gate inputs $130a_1$-$130a_n$, $130b_1$-$130b_n$, and $130c_1$-$130c_n$ to the H-bridges $106A_1$-$106A_n$, $106B_1$-$106B_n$, and $106C_1$-$106C_n$ coupled to the respective phase output lines 104A, 104B, and 104C may be switched at differing times. This temporal shifting of the switching instances causes the effective switching rates of the respective single-phase output signals to be multiplied by 2·n, or twice the number of H-bridges in each of the cascades. For example, low voltage H-bridges in commercially available conventional voltage drive systems 100 are typically switched at about 600 Hz. If a four-H-bridge cascade is used in each phase output line 104A, 104B, 104C, and if the four H-bridges in each cascade are all switched at differing times, the effective switching rate of each single-phase output signal will be eight times the individual H-bridge switching rate, or approximately 4800 Hz. This value is approximately 80 times the fundamental frequency of 60 Hz of the output waveform (and, thus, the frequency of phase voltage references 128a, 128b, and 128c) required to drive a standard speed motor drive in a typical application. Hence, the conventional voltage drive system 100 may provide low distortion output waveforms (i.e., on the phase output lines 104A, 104B and 104C) at high switch rates when the fundamental frequency of the phase voltage references 128a, 128b, and 128c to the deterministic controller 120 is at 60 Hz or lower. However, the conventional deterministic controller 120 causes significant distortion of the output waveforms when the fundamental frequency of the output waveform to be synthesized and the corresponding frequency phase voltage references 128a, 128b, and 128c is significantly higher than 60 Hz, such as a fundamental frequency of 600 Hz. This problem with conventional voltage drive systems 100 employing a deterministic controller 120 is discussed in further detail below.

As previously noted, the deterministic controller 120 typically employed in conventional voltage drive systems 100 switches the gate inputs $130a_1$-$130a_n$, $130b_1$-$130b_n$, and $130c_1$-$130c_n$ that are fed to the power switches of each H-bridge $106A_1$-$106A_n$, $106B_1$-$106B_n$, and $106C_1$-$106C_n$ at regular time intervals such that all pulses of the voltage waveforms of the single-phase output signals occur at regular time intervals. For example, one conventional system disclosed in U.S. Pat. No. 5,625,545 to Hammond is based on well-known sine-triangle modulation, in which a sinusoidal modulating waveform is compared to a triangular carrier waveform to generate H-bridge gate inputs. An example of such deterministic control is shown in FIG. 3, which illustrates a block diagram of the deterministic controller 120 as typically used in conventional voltage drive systems 200. The components of the deterministic controller 120 that correspond to each of the phase output lines 104A, 104B, and 104C are the same, and for simplicity and brevity in the discussion, only those components corresponding to the phase output line 104A and used to generate the gate inputs $130a_1$-$130a_n$ to control the H-bridges $106A_1$-$106A_n$ are described. Two duplicate sets of components corresponding to the phase output lines 104B and 104C may be employed in a similar manner in the deterministic controller 120 to generate the gate inputs $130b_1$-$130b_n$ and $130c_1$-$130c_n$, respectively, to control the H-bridges $106B_1$-$106B_n$ and $106C_1$-$106C_n$, respectively.

In FIG. 3, the phase voltage reference 128a from the current regulator 118 is input to each of n modulators $302_1$-$302_n$. An inverse phase voltage reference 332a, which is generated by an inverter 304, is also input to each of the n modulators $302_1$-$302_n$. In each of the n modulators $302_1$-$302_n$, signal generators $306_1$-$306_n$ generate zero-average triangular signals $307_1$-$307_n$ having the same amplitude and frequency as the waveform of the phase voltage reference 128a. The triangular signals $307_1$-$307_n$ are phase-shifted from one another by 180/n degrees so that the gate inputs $130a_1$-$130a_n$ that are generated cause the H-bridges $106A_1$-$106A_n$ in the phase output line 104A, 104B, or 104C to switch at differing times. Adders $308_1$-$308_n$ subtract the triangular signals $307_1$-$307_n$ from the phase voltage reference 128a, and adders $310_1$-$310_n$ subtract the triangular signals $307_1$-$307_n$ from the inverse phase voltage reference 332a.

The differences $309_1$-$309_n$ from adders $308_1$-$308_n$ are input to comparators $312_1$-$312_n$ and the differences $311_1$-$311_n$ from adders $310_1$-$310_n$ are input to comparators $314_1$-$314_n$. Each of comparators $312_1$-$312_n$ and $314_1$-$314_n$ outputs a positive voltage if the input it receives exceeds zero volts and a negative voltage if the input it receives is less than zero volts. The output voltage from each of comparators $312_1$-$312_n$ and $314_1$-$314_n$ is used to generate two gate inputs of a respective one of the plurality of sets of four gate inputs $130a_{1-1}$-$130a_{n-4}$ and $130a_{1-1}$-$130a_{n-4}$; one gate input is equal to the comparator output voltage, and the second gate input is the inverse of the comparator output voltage as generated by one of inverters $316_1$-$316_n$ and $318_1$-$318_n$. The four gate inputs $130a_1$-$130a_n$ generated by each of the modulators $302_1$-$302_n$ is input to a respective one of the H-bridges $106A_1$-$106A_n$ as shown in FIG. 1. Because the gate inputs $130a_1$-$130a_n$ vary in time solely based on a comparison of the phase voltage reference 128a or inverse phase voltage reference 332a to a triangular signal $307_1$-$307_n$, they switch at regular time intervals. Thus, the voltages of the single-phase output signals generated by the cascaded H-bridges $106A_1$-$106A_n$ are also switched or pulsed at regular time intervals.

A major shortcoming of such deterministic control is apparent when the conventional voltage drive system 100 is used to synthesize waveforms having high frequencies, such as 600 Hz. In order to switch the voltage waveform of the single-phase output signal at a PWM frequency of 60 times the desired output frequency, the effective switching rate of the single-phase output signal needs to be 36 kHz. Thus, each of the H-bridges $106A_1$-$106A_n$, $106B_1$-$106B_n$, or $106C_1$-$106C_n$ connected to the phase output line 104A, 104B, or 104C is required to be switched at one-eighth that frequency, or 4.5 kHz. Switching the H-bridges $106A_1$-$106A_n$, $106B_1$-$106B_n$, or $106C_1$-$106C_n$ at this rate is difficult because high switching losses are introduced. These switching losses are particularly pronounced when current flow through the H-bridges $106A_1$-$106A_n$, $106B_1$-$106B_n$, or $106C_1$-$106C_n$ is highest, which occurs at times corresponding to the peaks of the voltage waveform of the single-phase output signal generated by the cascaded H-bridges.

Moreover, as a result of a fixed switching rate, the output waveform generated by cascaded H-bridges $106A_1$-$106A_n$, $106B_1$-$106B_n$, or $106C_1$-$106C_n$ controlled by the deterministic controller 120 has significant distortion at times corresponding to the high slew rate portions and low slew rate portions of the waveform of the phase voltage reference 128a, 128b, or 128c supplied to the deterministic controller 120. This distortion occurs because the fixed switching rate is too low at the high slew rate portions of the waveform of the phase voltage reference 128a, 128b, or 128c and too high at the low slew rate portions of the waveform of the phase voltage reference 128a, 128b, or 128c. The distortion at these respective times can be observed at the zero crossings and peaks, respectively, of the output waveform generated by cascaded H-bridges $106A_1$-$106A_n$, $106B_1$-$106B_n$, or $106C_1$-$106C_n$.

FIG. 4 illustrates a voltage waveform 400 of a single-phase output signal synthesized by a conventional voltage drive system (e.g., 100 in FIG. 2) using a deterministic controller (e.g., 120 in FIG. 2) as described above to switch the H-bridges $106A_1$-$106A_n$, $106B_1$-$106B_n$, and $106C_1$-$106C_n$ at constant intervals or fixed rates. The voltage waveform 400 suffers from an unduly high amount of distortion near both its zero crossings and its peaks. Furthermore, known voltage drive systems employing the above-described deterministic control produce clearly defined tones at multiples of the fixed H-bridge switching frequency in the spectra (not shown) of the voltage and current of the single-phase output signals generated by the cascaded H-bridges $106A_1$-$106A_n$, $106B_1$-$106B_n$, or $106C_1$-$106C_n$. These tones often result in undesirable noise in applications where stringent acoustic specifications need to be met.

One possible method to improve the quality of the voltage waveform 400 involves increasing the switching frequency of the H-bridges $106A_1$-$106A_n$, $106B_1$-$106B_n$, and $106C_1$-$106C_n$ in an open-loop fashion at times corresponding to the high slew rate portions of the voltage waveform of the single-phase output signal. However, such open-loop incrementing of the switching frequency can introduce discontinuities and non-linearities in the single-phase output signal of the respective group of cascaded H-bridges.

Another conventional system disclosed in U.S. Pat. No. 5,933,339 to Duba et al. includes the injection of harmonic and non-harmonic content into the waveform of a phase voltage reference in order to vary the H-bridge switching rate at particular times and reduce the clearly defined tones in the spectrum of the output voltage and current. Injection of harmonic and non-harmonic components into the reference waveform could be construed as a type of non-deterministic modulation. However, the resulting switching pattern is fundamentally deterministic since the injected components are generated from within the control itself and are not a product of external events related to instantaneous source and/or load conditions.

Therefore, there is a need for a medium voltage drive system that overcomes the problems noted above and others previously experienced for synthesizing medium voltage phased output signals using H-bridges or other switched low voltage devices.

SUMMARY OF INVENTION

Systems and articles of manufacture consistent with the present invention provide a voltage drive system having a single-phase output signal to drive a load, such as a variable speed motor. The voltage drive system comprises a plurality of modulators and a plurality of switching circuits. A first of the modulators includes a first signal generator and a first adder. The first modulator receives a phase current error that reflects on a difference between a current reference and a current value of the single-phase output signal, and generates a first gate input based on the phase current error. The first switching circuit receives the first gate input and generates a first output terminal voltage based on the first gate input. The first signal generator generates a first reference signal having a first phase. The first adder receives the phase current error and the first reference signal and generates a first modulated phase current error based on the regulated phase current error and the first reference signal. The first modulator changes the first gate input from a first voltage level to a second voltage level to effectively cause a first switching event of the first switching circuit when the first modulated phase current error changes from being within a predetermined current range to being outside of the predetermined current range. A second of the modulators includes a second signal generator and a second adder. The second modulator receives the regulated phase current error and generates a second gate input. A second of the switching circuits receives the second gate input and generates a second output terminal voltage based on the second gate input. The second signal generator generates a second reference signal having a second phase different from the first phase of the first reference signal. The second adder receives the regulated phase current error and the second reference signal and generates a second modulated phase current error based on the regulated phase current error and the second reference signal. The second modulator changes the second gate input from a third voltage level to a fourth voltage level to effectively cause a second switching event of the second switching circuit when the second modulated current changes from being within the predetermined current range to being outside of the predetermined current range. The first reference signal and the second reference signal are generated such that the first switching event and the second switching event are separated by a time interval. The switching circuits are cascaded such that the switching circuits of the switching circuits collectively generate the single-phase output signal to the load. A voltage of the single-phase output signal is equal to a sum of an output terminal voltage of each of the plurality of switching circuits.

Systems and articles of manufacture consistent with the present invention provide another voltage drive system having a single-phase output signal to drive a load. The voltage drive system comprises a multi-level comparator, a decoder, and a plurality of switching circuits. The multi-level comparator receives a phase current error and generates a drive-state output corresponding to one of a plurality of predetermined voltage levels. The phase current error is based on a difference between a current reference and a current value of the single-phase output signal. The multi-level comparator changes the drive-state output to effectively cause a first switching event of the plurality of switching circuits when the phase current error changes from being within a first predetermined current range to being outside of the first predetermined current range. The multi-level comparator changes the drive-state output to effectively cause a second switching event of the plurality of switching circuits when the phase current error changes from being within a second predetermined current range to being outside of the second predetermined current range. The decoder receives the drive-state output and generates a plurality of gate inputs based on the drive-state output. Each of the plurality of switching circuits receives a respective one of the gate inputs and generates a respective output terminal voltage based on the respective one gate input. The switching circuits are cascaded such that the switching circuits collectively generate the single-phase output signal to the load. A voltage of the single-phase output signal is equal to a sum of the respective output terminal voltages of the plurality of switching circuits.

The present invention also provides a method in a voltage drive system for controlling a plurality of switching circuits to generate a single-phase output signal to drive a load. The method includes receiving a phase current error. The phase current error is based on a difference between a current reference and a current value of the single-phase output signal. The method further includes generating a first modulated phase current error based on the phase current error and a first reference signal having a first phase. The method further includes generating a second modulated phase current error based on the phase current error and a second reference signal having a second phase different from the first phase of the first reference signal. The method further includes changing a first gate input from a first voltage level to a second voltage level when the first modulated phase current error changes from being within a predetermined current range to being outside of the predetermined current range. The method further includes changing a second gate input from a third voltage level to a fourth voltage level when the second modulated phase current error changes from being within the predetermined current range to being outside of the predetermined current range. The method further includes providing the first gate input and the second gate input to a plurality of switching circuits. Changing the first gate input effectively causes a first switching event of a first of the switching circuits. Changing the second gate input effectively causes a second switching event of a second of the switching circuits. The first reference signal and the second reference signal are such that the first switching event and the second switching event are separated by a time interval. The method further includes generating an output terminal voltage of each of the plurality of switching circuits. The plurality of switching circuits is cascaded such that the switching circuits of the plurality of switching circuits collectively generate the single-phase output signal to the load. A voltage of the single-phase output signal is equal to a sum of an output terminal voltage of each of the plurality of switching circuits.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF DRAWINGS

The accompanying drawings, which are incorporated in and constitute a part of the specification, illustrate implementations of the present invention and, together with the description, serve to explain the advantages and principles of the invention. In the drawings.

DETAILED DESCRIPTION OF THE INVENTION

Reference will now be made in detail to implementations in accordance with methods, systems, and products consistent with the present invention as illustrated in the accompanying drawings.

Figure 5:
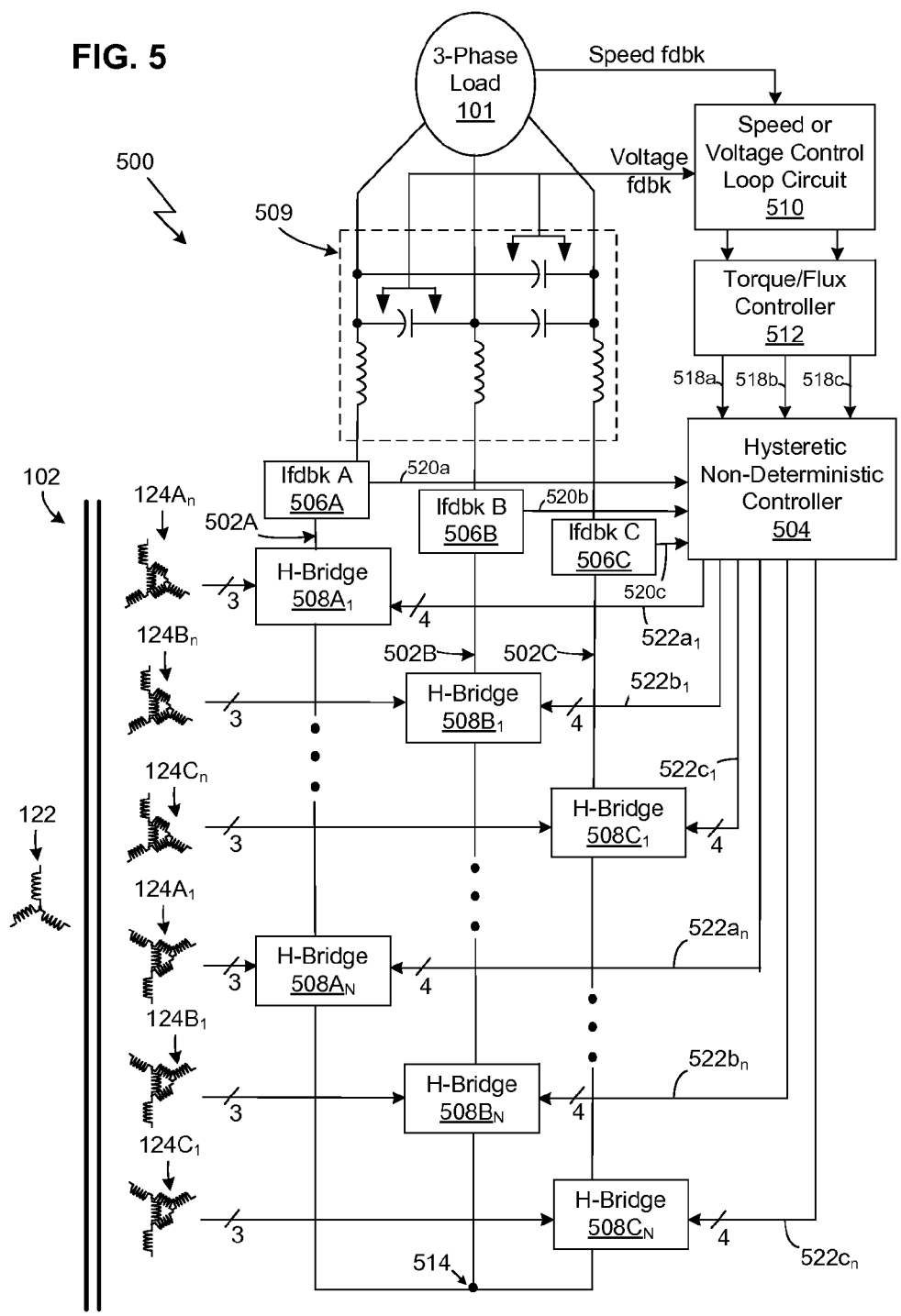
FIG. 5 is a block diagram of an exemplary voltage drive system consistent with the present invention.

FIG. 5 illustrates a block diagram of an exemplary voltage drive system 500 consistent with the present invention. In the implementation shown in FIG. 5, the voltage drive system 500 is depicted as driving a three-phase load 101. For example, the three-phase load 101 may be a medium voltage pulse modulated, induction, or synchronous motor requiring three phase, alternate current at variable frequency to control the speed of the motor. However, as described in detail herein, voltage drive systems 500 and 900 consistent with the present invention may be configured to generate one or more single-phase output signals to control or drive a motor or other load.

The voltage drive system 500 includes phase output lines 502A, 502B, and 502C (which respectively represent Phase A, Phase B, and Phase C single-phase output signals); a hysteretic non-deterministic controller 504 (hereinafter "the hysteretic controller"); current feedback circuits 506A, 506B, and 506C; and a plurality of cascaded groups of H-bridges $508A_1$-$508A_n$, $508B_1$-$508B_n$, and $508C_1$-$508C_n$. The voltage drive system 500 may also include an input transformer 102; an ac filter 509 to filter the one or more single-phase output signals generated on phase output lines 502A, 502B, and 502C in accordance with the present invention; a speed or voltage control loop circuit 510; and a torque/flux controller 512. As discussed in detail below, the hysteretic controller 504 employed in the voltage drive system 500 enables the switching rates of H-bridges $508A_1$-$508A_n$, $508B_1$-$508B_n$, and $508C_1$-$508C_n$ to be increased at times corresponding to the zero crossings of the voltage waveforms of the single-phase output signals and decreased at times corresponding to the peaks of the voltage waveforms of the single-phase output signals generated by the respective cascaded groups of H-bridges $508A_1$-$508A_n$, $508B_1$-$508B_n$, and $508C_1$-$508C_n$ on respective phase output lines 502A, 502B and 502C.

The input transformer 102 may include a primary winding circuit 122 and secondary winding circuits $124A_1$-$124A_n$, $124B_1$-$124B_n$, and $124C_1$-$124C_n$. In operation, three-phase ac input power is supplied to the primary winding circuit 122 of input transformer 102. The primary winding circuit 122 may be arranged in either a wye or delta configuration. The primary winding circuit 122 energizes each of the secondary winding circuits $124A_1$-$124A_n$, $124B_1$-$124B_n$, and $124C_1$-$124C_n$. Each of the secondary winding circuits $124A_1$-$124A_n$, $124B_1$-$124B_n$, and $124C_1$-$124C_n$ may also be arranged in either a wye or delta configuration. In one implementation, the secondary winding circuits $124A_1$-$124A_n$ are phase-shifted from the secondary winding circuits $124B_1$-$124B_n$, which are in turn phase-shifted from the secondary winding circuits $124C_1$-$124C_n$, in order to improve the quality of the waveforms delivered by the secondary winding circuits $124A_1$-$124A_n$, $124B_1$-$124B_n$, and $124C_1$-$124C_n$ and distribute power to the H-bridges $508A_1$-$508A_n$, $508B_1$-$508B_n$, and $508C_1$-$508C_n$. In the implementation shown in FIG. 5, the output of each of the respective secondary winding circuits $124A_1$-$124A_n$, $124B_1$-$124B_n$, and $124C_1$-$124C_n$ provides three single-phase power inputs to a respective one of the H-bridges $508A_1$-$508A_n$, $508B_1$-$508B_n$, and $508C_1$-$508C_n$.

Alternatively, three-phase active rectifier front ends (not shown in the figures) can be used to achieve regeneration and control of the harmonics in the waveforms delivered by the secondary winding circuits $124A_1$-$124A_n$, $124B_1$-$124B_n$, and $124C_1$-$124C_n$, thereby eliminating the need for phase shifting the secondary winding circuits $124A_1$-$124A_n$, $124B_1$-$124B_n$, and $124C_1$-$124C_n$ in the manner described above. Isolated dc power supplies (not shown in the figures) may also be used in place of the input transformer 102, with no requirement of phase shifting.

Each of the phase output lines 502A, 502B, and 502C are coupled to and driven by a respective number (n) of cascaded switching circuits. In the implementation shown in FIG. 5, the switching circuits are H-bridges, and the respective phase output lines 502A, 502B, and 502C are coupled to and driven by a respective number (n) of cascaded H-bridges $508A_1$-$508A_n$, $508B_1$-$508B_n$, and $508C_1$-$508C_n$. In this implementation, the phase output line 502A is coupled to a first H-bridge $508A_1$ and each subsequent H-bridge (e.g., a second H-bridge $508A_2$ or last H-Bridge $508A_n$) is cascaded with the previous H-Bridge (e.g., the second H-bridge $508A_2$ is cascaded with the first H-bridge $508A_1$ and the last H-bridge $508A_n$ is cascaded with the second H-bridge $508A_2$). The phase output lines 502B and 502C are similarly coupled to a respective first H-bridge $508B_1$ or $508C_1$, a second H-bridge $508B_n$ or $508C_n$ cascaded with the first H-bridge $508B_1$ or $508C_1$ and a next H-bridge $508B_n$ or $508C_n$ cascaded with the second H-bridge $508B_2$ or $508C_2$ In one implementation in which each H-bridges $508A_1$-$508A_n$, $508B_1$-$508B_n$, and $508C_1$-$508C_n$ is implemented consistent with H-bridges 200, the output terminals 212 and 214 of the H-bridges $508A_1$-$508A_n$ are electrically connected in a "daisy-chained" manner such that output terminal 214 of a first H-bridge $508A_1$ is electrically connected to output terminal 212 of the second H-bridge $508A_1$, the output terminal 214 of the second H-bridge $508A_2$ is electrically connected to the output terminal 212 of the next or last H-bridge $508A_n$. H-bridges $106B_1$-$106B_n$ and $106C_1$-$106C_n$ may be cascaded in the same manner. In this implementation, the output terminal 214 of the last H-bridge $508A_n$, $508B_n$ and $508C_n$ of each cascaded group of H-bridges $508A_1$-$508A_n$, $508B_1$-$508B_n$, and $508C_1$-$508C_n$ are joined by a WYE connection to form a floating neutral point 514.

As shown in FIG. 5, the voltage drive system 500 does not require a current regulator 118 as employed in conventional voltage drive systems 100 because the hysteretic controller 504 operates directly on phase current references, and not on phase voltage references. The hysteretic controller 504 receives, from the torque/flux controller 512, phase current references 518a, 518b, and 518c corresponding to each of the single-phase output signals to be generated on a respective phase output line 502A, 502B, and 502C. The phase current references 518a, 518b, and 518c may be provided in the standard A, B, C reference frame. It is preferable to keep the phase current references in the A, B, C reference frame because converting to the d, q reference frame introduces latencies and delays. Additionally, current feedback circuits 506A, 506B, and 506C generate phase current feedbacks 520a, 520b, and 520c in the A, B, C reference frame, and not the d, q reference frame. Each current feedback circuit 506A, 506B, and 506C is configured to generate a respective phase current feedback 520a, 520b, or 520c based on the value of the current of the single-phase output signal present on the respective phase output line 502A, 502B, or 502C as driven by the respective group of cascaded H-bridges $508A_1$-$508A_n$, $508B_1$-$508B_n$, or $508C_1$-$508C_n$. In one implementation, the waveform of each phase current feedback 520a, 520b, and 520c has an amplitude equal to that of a corresponding one of the phase current references 518a, 518b, and 518c. The phase current feedbacks 520a-520c are input to the hysteretic controller 504.

In one implementation, each of the H-bridges $508A_1$-$508A_n$, $508B_1$-$508B_n$, and $508C_1$-$508C_n$ may be implemented consistent with the H-bridge 200. In this implementation, each of the H-bridges $508A_1$-$508A_n$, $508B_1$-$508B_n$, and $508C_1$-$508C_n$ receives, from the hysteretic controller 504, a respective one set of a plurality of sets of four gate inputs $522a_1$-$522a_n$, $522b_1$-$522b_n$, and $522c_1$-$522c_n$ and generates a voltage between the respective H-bridge's output terminals 212 and 214 based on the four gate inputs (e.g., $522a_1$) that are received by the respective H-bridge (e.g., $508A_1$) from the hysteretic controller 504. In one implementation, for each of the H-bridges $508A_1$-$508A_n$, $508B_1$-$508B_n$, and $508C_1$-$508C_n$, if power switches 108a and 108d of the respective H-bridge are active, the voltage between the output terminals 212 and 214 of the respective H-bridge will be the supply voltage used to power the power switches 108a-108d. If power switches 108b and 108c are active, the voltage between the output terminals 212 and 214 of the respective H-bridge will be the negative of the supply voltage. If power switches 108a and 108c are active, or if power switches 108b and 108d are active, the voltage between the output terminals 212 and 214 of the H-bridge will be zero volts.

The power switches may be bipolar junction transistors, metal-oxide-semiconductor field effect transistors, insulated-gate bipolar transistors, integrated gate commutated thyristors, or any suitable type of power switch.

The H-bridges $508A_1$-$508A_n$, $508B_1$-$508B_n$, and $508C_1$-$508C_n$ are cascaded; that is, their output terminals are electrically connected, such that the respective H-bridges $508A_1$-$508A_n$, $508B_1$-$508B_n$, and $508C_1$-$508C_n$ collectively generate the respective single-phase output signals on the respective phase output lines 502A, 502B, and 502C. More particularly, the groups of H-bridges $508A_1$-$508A_n$, $508B_1$-$508B_n$, and $508C_1$-$508C_n$ are cascaded such that the voltage of the respective single-phase output signal collectively generated by the respective group of H-bridges are equal to the sums of the voltages between the output terminals 212 and 214 of the each H-bridge in the cascaded group of H-bridges $508A_1$-$508A_n$, $508B_1$-$508B_n$, or $508C_1$-$508C_n$. In one implementation, the H-bridges $508A_1$-$508A_n$, $508B_1$-$508B_n$, and $508C_1$-$508C_n$ may be cascaded in the same manner as the H-bridges $106A_1$-$106A_n$, $106B_1$-$106B_n$, and $106C_1$-$106C_n$ in FIG. 1. In the implementation shown in FIG. 5, the three single-phase output signals generated by the H-bridges $508A_1$-$508A_n$, $508B_1$-$508B_n$, and $508C_1$-$508C_n$ present on the phase output lines 502A, 502B, and 502C are used to drive the three-phase load 101.

Figure 6:
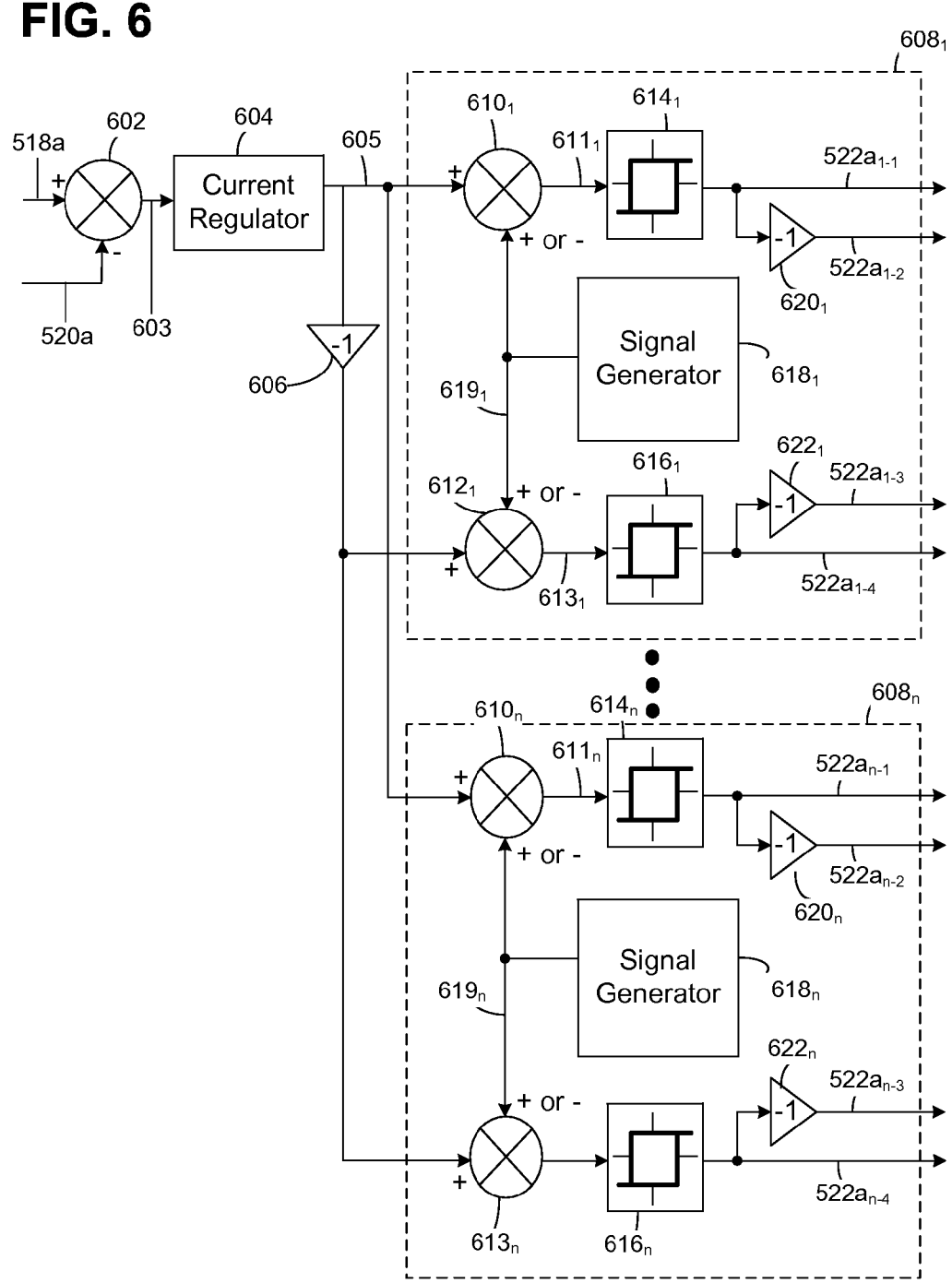
FIG. 6 is a block diagram of an exemplary hysteretic non-deterministic controller employed in the voltage drive system of FIG. 5 in accordance with the present invention.

The hysteretic controller 504 controls the operation of the voltage drive system 500. FIG. 6 illustrates a block diagram of one implementation of the hysteretic controller 504. The components of the hysteretic controller 504 shown in FIG. 6 correspond to the components for controlling one group of H-bridges $508A_1$-$508A_n$, $508B_1$-$508B_n$, or $508C_1$-$508C_n$ to generate a single-phase output signal on a corresponding one of the phase output lines 502A, 502B, or 502C in accordance with the present invention. However, two duplicate sets of components as shown in FIG. 6 may be employed in the hysteretic controller 504 to control the other two groups of H-bridges in a similar manner. Therefore, for simplicity and brevity in the discussion, only those components corresponding to one group of H-bridges $508A_1$-$508A_n$, $508B_1$-$508B_n$, or $508C_1$-$508C_n$ and one of the phase output lines 502A, 502B, or 502C are shown and described herein.

For each phase output line 502A, 502B, and 502C, the hysteretic controller 504 includes a first adder 602, a proportional integral current regulator 604, a first inverter 606, and one or more hysteretic modulators $608_1$-$608_n$ (e.g., first hysteretic modulator $608_1$ and second hysteretic modulator $608_n$). Each hysteretic modulator $608_1$-$608_n$ includes a second adder $610_1$-$620_n$, a third adder $612_1$-$612_n$, a first hysteretic comparator $614_1$-$614_n$, a second hysteretic comparator $616_1$-$616_n$, a signal generator $618_1$-$618_n$, a second inverter $620_1$-$620_n$, and a third inverter $622_1$-$622_n$.

As shown in FIG. 6, the output of the first adder 602 is electrically coupled to the input of the proportional integral current regulator 604. The output of the proportional integral current regulator 604 is electrically coupled to the input of the first inverter 606 and an input of each of the hysteretic modulators $608_1$-$608_n$. Within each of the hysteretic modulators $608_1$-$608_n$, the output of the respective signal generators $618_1$-$618_n$ are electrically coupled to an input of the respective second adders $610_1$-$610_n$ and an input of the respective third adders $612_1$-$612_n$. The output of the second adder $610_1$ or $610_n$ employed in each hysteretic modulator is electrically coupled to the input of the respective first hysteretic comparator $614_1$ or $614_n$. The output of the third adder $612_1$ or $612_n$ employed in each hysteretic modulator is electrically coupled to the input of the respective second hysteretic comparator $616_1$ or $616_n$. The output of the first hysteretic comparator $614_1$ or $614_n$ employed in each hysteretic modulator $608_1$-$608_n$ is electrically coupled to a corresponding second inverter $620_1$ or $620_n$. Similarly, the output of the second hysteretic comparator $616_1$ or $616_n$ employed in each hysteretic modulator $608_1$-$608_n$ is electrically coupled to a corresponding third inverter $622_1$ or $622_n$.

With continued reference to FIG. 6, the operation of the hysteretic controller 504 will be described in further detail. For each phase output line 502A, 502B, and 502C, the first adder 602 receives as input a respective one of the phase current references 518a, 518b, and 518c (e.g., 518a is shown as input to the adder 602 in FIG. 6) from the torque/flux controller 512 and a respective one of the phase current feedbacks 520a, 520b, and 520c from a respective one of the current feedback circuits 506A, 506B, and 506C. The first adder 602 generates and outputs to the proportional integral current regulator 604 a phase current error 603 corresponding to a difference between the phase current reference 518a, 518b, or 518c and the corresponding phase current feedback 520a, 520b, or 520c (e.g., 520a is as input to the adder 602 in FIG. 6). The output 605 of the proportional integral current regulator 604 is based on and proportional to the phase current error 603. The output 605 of the proportional integral current regulator 604 will be referred to herein as a regulated phase current error 605. In one implementation, the proportional integral current regulator 604 may be omitted. In this implementation, the phase current error 603 output by the first adder 602 would be the regulated phase current error.

The first inverter 606 generates an inverse 607 of the regulated phase current error 605. The regulated phase current error 605 and the inverse regulated phase current error 607 are input to each of the hysteretic modulators $608_1$-$608_n$.

Each of the hysteretic modulators $608_1$-$608_n$ receives the regulated phase current error 605 and the inverse regulated phase current error 607 and generates a respective one of the plurality of sets of four gate inputs $522a_{1\text{-}1}$-$522a_{1\text{-}4}$ ... $522a_{N\text{-}1}$-$522a_{n\text{-}4}$, $522b_{1\text{-}1}$-$522b_{1\text{-}4}$ ... $522b_{N\text{-}1}$-$522b_{n\text{-}4}$, or $522c_{1\text{-}1}$-$522c_{1\text{-}4}$ ... $522c_{N\text{-}1}$-$522c_{n\text{-}4}$ to drive a respective one of the H-bridges $508A_1$-$508A_n$, $508B_1$-$508B_n$, or $508C_1$-$508C_n$ as discussed in further detail herein. The regulated phase current error 605 and the inverse regulated phase current error 607 are each modulated via the second adders $610_1$-$610_n$ and the third adders $612_1$-$612_n$, respectively, and via zero-average reference signals (e.g., triangular waveform signals) $619_1$-$619_n$ generated by each of the signal generators $618_1$-$618_n$, to generate currents which will be collectively referred to herein as modulated phase current errors $611_1$-$611_n$, as shown in FIG. 6. For example, a first modulated phase current error $611_1$ is generated in the first hysteretic modulator $608_1$ and a second modulated phase current error $611_n$ is generated in the second hysteretic modulator $608_n$. In the implementation shown in FIG. 6, the second adder $610_1$-$610_n$ employed in each hysteretic modulator $608_1$-$608_n$ receives the regulated phase current error 605 (or the phase current error 603 if the proportional integral current regulator 604 is omitted) and a respective reference or triangular signal $619_1$ or $619_n$ from the signal generator $618_1$ or $618_n$ and generates a respective modulated phase current error $611_1$ or $611_n$ based on a difference between the regulated phase current error 605 and the respective reference or triangular signal $619_1$ or $619_n$.

The third adder $612_1$-$612_n$ of each hysteretic modulator $608_1$-$608_n$ receives the inverse regulated phase current error 607 and the reference or triangular signal $619_1$ or $619_n$ and generates a corresponding modulated inverse phase current error $613_1$ or $613_n$ based on a difference between the inverse regulated phase current error 605 and the respective reference or triangular signal $619_1$ or $619_n$. Thus, for example, a first modulated inverse phase current error $613_1$ is generated in the first hysteretic modulator $608_1$ via the third adder $612_1$. Alternatively, because each of the respective reference or triangular signals $619_1$-$619_n$ output by the signal generators $618_1$-$618_n$ is a zero-average signal, the modulated phase current errors $611_1$-$611_n$ and the modulated inverse phase current errors $613_1$-$613_n$ may also be based on sums, not differences, of these inputs to adders $610_1$-$610_n$ and $612_1$-$612_n$.

As shown in FIG. 6, each of the modulated phase current errors $611_1$-$611_n$ generated based on the regulated phase current error 605 (or the phase current error 603) is input to a respective first hysteretic comparator $614_1$-$614_n$. Each of the modulated inverse phase current errors $613_1$-$613_n$ generated based on the inverse regulated phase current error 607 (or the inverse of the phase current error 603) is input to a respective second hysteretic comparator $616_1$-$616_n$. The output of each of the respective first hysteretic comparators $614_1$-$614_n$ is used to generate two gate inputs (e.g., $522a_{1\text{-}1}$ and $522a_{1\text{-}2}$ or $522a_{N\text{-}1}$ and $522a_{n\text{-}2}$) of the respective set of four gate inputs $522a_{1\text{-}1}$-$522a_{1\text{-}4}$ ... $522a_{N\text{-}1}$-$522a_{n\text{-}4}$, to control cascaded H-bridges $508A_1$-$508A_n$. As previously noted, two duplicate sets of the components shown in FIG. 6 may be employed in the hysteretic controller 504 to generate the gate inputs $522b_{1\text{-}1}$-$522b_{1\text{-}4}$ ... $522b_{N\text{-}1}$-$522b_{n\text{-}4}$ and $522c_{1\text{-}1}$-$522c_{1\text{-}4}$ ... $522c_{N\text{-}1}$-$522c_{n\text{-}4}$ to control cascaded H-bridges $508B_1$-$508B_n$ and $508C_1$-$508C_n$, respectively. Each gate input is input to the gate or base of one power switch of the respective one of the H-bridges $508A_1$-$508A_n$, $508B_1$-$508B_n$, or $508C_1$-$508C_n$. One gate input (e.g., $552a_{1\text{-}1}$ or $522n_{1\text{-}1}$) is simply the output of the respective first hysteretic comparator $614_1$ or $614_n$, and the other gate input (e.g., $522a_{1-2}$ or $522n_{1-2}$) is the inverse of that output as generated by a respective one of the second inverters $620_1$ or $620_n$. In the same manner, the output of each of the respective second hysteretic comparators $616_1$-$616_n$ is used to generate the two additional gate inputs (e.g., $522a_{1-3}$ and $522a_{1-4}$ or $522a_{N-3}$ and $522a_{n-4}$) of the respective set of four gate inputs $522a_1$-$522a_n$ to control cascaded H-bridges $508A_1$-$508A_n$. The gate inputs $522b_1$-$522b_n$ and $522c_1$-$522c_n$ of the other cascaded H-bridges $508B_1$-$508B_n$ and $508C_1$-$508C_n$ may be generated in the hysteretic controller 504 using duplicate sets of components as previously discussed. One gate input (e.g., $522a_{1-3}$ or $522n_{1-3}$) is simply the output of the respective second hysteretic comparator $616_1$ or $616_n$, and the other gate input (e.g., $522a_{1-4}$ or $522n_{1-4}$) is the inverse of that output as generated by a respective one of the third inverters $622_1$-$622_n$.

Each of the first hysteretic comparators $614_1$-$614_n$ and each of the second hysteretic comparators $616_1$-$616_n$ compares the modulated phase current error (e.g., $611_1$ or $611_n$) or the modulated inverse phase current error (e.g., $613_1$ or $613_n$) received by the respective hysteretic comparator to a predetermined current range defined by a predetermined lower current limit, such as a minimum current (e.g., –h), and a predetermined upper current limit, such as a maximum current (e.g., +h). The predetermined current range may also be referred to as a predetermined hysteresis band. In one implementation, the predetermined lower current limit is the negative of the predetermined upper current limit.

Each of the first hysteretic comparators $614_1$-$614_n$ and each of the second hysteretic comparators $616_1$-$616_n$ is operatively configured to switch its output to a high (e.g., logic "1") output voltage if the modulated phase current error (e.g., $611_1$ or $611_n$) or the modulated inverse phase current error (e.g., $613_1$ or $613_n$) received by the respective hysteretic comparator changes from being within the predetermined current range to being greater than the predetermined upper current limit (e.g., +h) of the predetermined current range.

Each of the first hysteretic comparators $614_1$-$614_n$ and each of the second hysteretic comparators $616_1$-$616_n$ is operatively configured to switch its output to a low (e.g., logic "0") output voltage if the modulated phase current error (e.g., $611_1$ or $611_n$) or the modulated inverse phase current error (e.g., $613_1$ or $613_n$) received by the respective hysteretic comparator changes from being within the predetermined current range to being less than the predetermined lower current limit (e.g., –h) of the predetermined current range.

In both of the above situations, each of the two gate inputs of the respective set of four gate inputs $522a_1$-$522a_n$, $522b_1$-$522b_n$, or $522c_1$-$522c_n$ which are generated by the respective hysteretic comparator $614_1$, $616_1$, $614_n$ or $616_n$ are changed from a first voltage level to a second voltage level. This change in gate input voltage effectively causes a switching event of a respective one of the H-bridges $508A_1$-$508A_n$, $508B_1$-$508B_n$, or $508C_1$-$508C_n$. Switching event, as that term is used herein, means a change in the voltage between the output terminals 212 and 214 of one of the H-bridges $508A_1$-$508A_n$, $508B_1$-$508B_n$, or $508C_1$-$508C_n$ caused by a change in a respective set of four gate inputs $522a_1$-$522a_n$, $522b_1$-$522b_n$, or $522c_1$-$522c_n$ to the H-bridge under the control of the hysteretic controller 504.

In one implementation, however, the change in gate input voltage does not cause a switching event of the respective one of the H-bridges $508A_1$-$508A_n$, $508B_1$-$508B_n$, or $508C_1$-$508C_n$ because the change in gate input voltage results in a redundant state of the respective one of the H-bridges $508A_1$-$508A_n$, $508B_1$-$508B_n$, or $508C_1$-$508C_n$. For example, Table 1 indicates the voltage between the output terminals 212 and 214 of one of the H-bridges (e.g., $508A_1$) as caused by each possible state of the respective set of four gate inputs (e.g., $522a_{1-1}$-$522a_{1-4}$) to the one H-bridge (e.g., $508A_1$) generated by a corresponding first hysteretic comparator (e.g., $614_1$) and a corresponding second hysteretic comparator (e.g., $616_1$).

TABLE 1

| State | Gate inputs from $614_1$ | | Gate inputs from $616_1$ | | H-bridge $508A_1$ output voltage |
|---|---|---|---|---|---|
| | $522a_{1-1}$ (to 108a) | $522a_{1-2}$ (to 108b) | $522a_{1-3}$ (to 108c) | $522a_{1-4}$ (to 108d) | |
| 0 | 0 | 1 | 0 | 1 | ZERO |
| 1 | 0 | 1 | 1 | 0 | – SUPPLY VOLTAGE |
| 2 | 1 | 0 | 0 | 1 | + SUPPLY VOLTAGE |
| 3 | 1 | 0 | 1 | 0 | ZERO |

As shown in Table 1, states 0 and 3 of the respective set of four gate inputs (e.g., $522a_1$) are redundant states which both result in zero voltage between the output terminals 212 and 214 of the one H-bridge (e.g., $508A_1$). Accordingly, it will be seen that if the two gate inputs (e.g., $522a_{1-1}$ and $522a_{1-2}$) of the respective set of four gate inputs (e.g., $522a_1$) generated by the corresponding first hysteretic comparator (e.g., $614_1$) change from logic "0" (for the first gate input) and logic "1" (for the second gate input), or vice versa, to logic "1" (for the first gate input) and logic "0" (for the second gate input), and the two gate inputs (e.g., $522a_{1-3}$ and $522a_{1-4}$) of the respective set of four gate inputs (e.g., $522a_1$) generated by the corresponding second hysteretic comparator (e.g., $616_1$) undergo the same change at the same time, no switching event of the respective one of the H-bridges $508A_1$-$508A_n$, $508B_1$-$508B_n$, or $508C_1$-$508C_n$ occurs.

Moreover, in one implementation, if the output of the respective hysteretic comparator $616_1$, $614_1$, $614_n$ or $616_n$ is already at a high (e.g., logic "1") output voltage, the respective hysteretic comparator will maintain its output at the high output voltage if the modulated phase current error (e.g., $611_1$ or $611_n$) or the modulated inverse phase current error (e.g., $613_1$ or $613_n$) received by the respective hysteretic comparator changes from being within the predetermined current range to being greater than the predetermined upper current limit (e.g., +h) of the predetermined current range. In this implementation, the respective hysteretic comparator $616_1$, $614_1$, $614_n$ or $616_n$ effectively determines that the phase current error 603 still exceeds the upper current limit of the hysteresis band (i.e., greater than +h) and the corresponding power switch (e.g., $208_a$) of the H-bridge (e.g., $508A_1$) still needs to output the positive supply voltage and not be switched off or to the negative supply voltage.

Similarly, in one implementation, if the output of the respective hysteretic comparator $616_1$, $614_1$, $614_n$ or $616_n$ is already at a low (e.g., logic "0") output voltage, the respective hysteretic comparator will maintain its output at the low output voltage if the modulated phase current error (e.g., $611_1$ or $611_n$) or the modulated inverse phase current error (e.g., $613_1$ or $613_n$) received by the respective hysteretic comparator changes from being within the predetermined current range to being less than the predetermined lower current limit (e.g., –h) of the predetermined current range. In this implementation, the respective hysteretic comparator $616_1$, $614_1$, $614_n$ or $616_n$ effectively determines that the phase current error 603 still exceeds the lower current limit of the hysteresis band (i.e., less than −h) and the corresponding power switch (e.g., $208_a$) of the H-bridge (e.g., $508A_1$) still needs to output the negative supply voltage and not be switched off or to the positive supply voltage. Accordingly, in these two situations, no switching event of the respective one of the H-bridges $508A_1$-$508A_n$, $508B_1$-$508B_n$, or $508C_1$-$508C_n$ occurs under the control of the hysteretic controller 504.

Each of the first hysteretic comparators $614_1$-$614_n$ and each of the second hysteretic comparators $616_1$-$616_n$ is further operatively configured to maintain its output voltage, and therefore the two gate inputs of the respective set of four gate inputs $522a_1$-$522a_n$, $522b_1$-$522b_n$, or $522c_1$-$522c_n$ which are generated by the respective hysteretic comparator, at the level last generated by the respective hysteretic comparator if the modulated phase current error (e.g., $611_1$ or $611_n$) or the modulated inverse phase current error (e.g., $613_1$ or $613_n$) received by the respective hysteretic comparator is within the predetermined current range or hysteresis band.

At the low slew rate portions (such as the sinusoidal peaks) of the waveforms of each of the phase current references 518a, 518b, and 518c, the values of the corresponding modulated phase current errors $611_1$-$611_n$ and the values of the corresponding modulated inverse phase current errors $613_1$-$613_n$ (and corresponding phase current error 603) typically exceed the predetermined current range or hysteresis band (+/−h) less frequently because the low slew rate portions of the waveform of the respective phase current reference 518a, 518b, or 518c are those portions at which the phase current reference 518a, 518b, or 518c, on which the values of the modulated phase current errors and the modulated inverse phase current errors ultimately depend, changes more slowly. Conversely, at the high slew rate portions (such as the zero-crossings) of the waveforms of each of the phase current references 518a, 518b, and 518c, the values of the modulated phase current errors $611_1$-$611_n$ and the values of the modulated inverse phase current errors $613_1$-$613_n$ typically exceed the predetermined current range or hysteresis band (+/−h) more frequently because the respective phase current reference 518a, 518b, or 518c changes more rapidly. Moreover, the low slew rate portions and high slew rate portions, respectively, of the waveform of each of the phase current references 518a, 518b, and 518c occur at the same times as would the low slew rate portions and high slew rate portions, respectively, of the waveform of each of the phase voltage references received by the deterministic controller 120 employed in the conventional voltage drive system 100. As will be recognized by one of ordinary skill in the art, this correspondence occurs because the two waveforms are proportional to one another. As will be further recognized by one of ordinary skill in the art, the low slew rate portions and high slew rate portions, respectively, of the waveform of the phase voltage reference occur at approximately the same times as do the low slew rate portions and high slew rate portions, respectively, of the voltage waveform of the single-phase output signal on the respective phase output line 502A, 502B, or 502C.

Given this correspondence, the above-described behavior also occurs because at the low slew rate portions of the waveform of the phase current reference 518a, 518b, or 518c, the current value of the single-phase output signal on the respective phase output line 502A, 502B, or 502C—on which the values of the modulated phase current errors and the values of the modulated inverse phase current errors ultimately depend—changes less rapidly. This less rapid change occurs because the low slew rate portions of the waveform of the phase current reference 518a, 518b, or 518c correspond to the low slew rate portions—that is, the peaks—of the voltage waveform of the single-phase output signal, at which a lesser voltage differential exists between the voltage value of the single-phase output signal on the respective phase output line 502A, 502B, or 502C and the supply voltages to the respective H-bridges $508A_1$-$508A_n$, $508B_1$-$508B_n$, or $508C_1$-$508C_n$. Conversely, at the high slew rate portions of the waveform of the phase current reference 518a, 518b, or 518c, the current value of the single-phase output signal on the respective phase output line 502A, 502B, or 502C changes more rapidly—thus further contributing to the above-described behavior—because a greater voltage differential exists between the voltage value of the single-phase output signal on the respective phase output line 502A, 502B, or 502C and the supply voltages to the respective H-bridges $508A_1$-$508A_n$, $508B_1$-$508B_n$, or $508C_1$-$508C_n$.

In view of the above-described behavior, the hysteretic non-deterministic control scheme employed by the hysteretic controller 504 to change the gate inputs $522a_1$-$522a_n$, $522b_1$-$522b_n$, and $522c_1$-$522c_n$, as described herein, has the desired result of causing an increase in the frequency of the switching events of the H-bridges $508A_1$-$508A_n$, $508B_1$-$508B_n$, or $508C_1$-$508C_n$ at times corresponding to the high slew rate portions of the voltage waveform of the single-phase output signal on the respective phase output line 502A, 502B, or 502C and causing a decrease in the frequency of the switching events of H-bridges $508A_1$-$508A_n$, $508B_1$-$508B_n$, or $508C_1$-$508C_n$ at times corresponding to the low slew rate portions of the voltage waveform of the single-phase output signal on the respective phase output line 502A, 502B, or 502C. Thus, by changing the gate inputs $522a_1$-$522a_n$, $522b_1$-$522b_n$, and $522c_1$-$522c_n$ to the H-bridges in accordance with the hysteretic non-deterministic control scheme as described herein, the hysteretic controller 504 is able to prevent the above-described distortions resulting from too high of a switching rate at the low slew rate portions, and too low of a switching rate at the high slew rate portions, of the voltage waveform of the single-phase output signal on the respective phase output line 502A, 502B, or 502C. Unlike conventional deterministic controllers 120 that provide for fixed rate H-bridge switching, the hysteretic controller 504 is also able to reduce H-bridge switching losses because of the decrease in switching frequency at times of high current flow through the H-bridges $106A_1$-$106A_n$, $106B_1$-$106B_n$, or $106C_1$-$106C_n$. Moreover, the spreading of energy resulting from the increases and decreases in switching frequency allows the hysteretic controller 504 to eliminate the clearly defined tones in the spectrum (not shown) of the single-phase output voltage and single-phase output current. Additionally, the use of a closed-loop system of the voltage drive system 500 to both increase and decrease the switching events of the H-bridges $508A_1$-$508A_n$, $508B_1$-$508B_n$, or $508C_1$-$508C_n$ prevents the discontinuities and non-linearities that result from open-loop control, as discussed above.

The use of an appropriately sized predetermined current range or hysteresis band by the hysteretic controller 504 introduces an appropriate degree of hysteresis in the phase current error 603 (reflecting the hysteresis in the switching of the gate inputs $522a_1$-$522a_n$, $522b_1$-$522b_n$, or $522c_1$-$522c_n$ corresponding to the respective H-bridges $508A_1$-$508A_n$, $508B_1$-$508B_n$, or $508C_1$-$508C_n$) and allows the requisite effective switching rate to be achieved by the hysteretic controller 504 without the excessive switching of the H-bridges $508A_1$-$508A_n$, $508B_1$-$508B_n$, or $508C_1$-$508C_n$ that would result if the predetermined current range or hysteresis band were too small. In one implementation, the size of the predetermined current range or hysteresis band is proportional or equal to the amplitude of the waveform of the phase current reference 518a, 518b, or 518c.

Moreover, because a switching event of one of the cascaded H-bridges (e.g., $508A_1$) under the control of the hysteretic controller 504 includes a change in the voltage between the output terminals 212 and 214 of the one H-bridge (e.g., $508A_1$), the corresponding single-phase output signal on the respective phase output line (e.g., 502A) changes as a result of the switching event. More particularly, as will be recognized by one of ordinary skill in the art upon review of the present application and with particular reference to Table 1, because the switching event is effectively caused by a change in the value of a respective modulated phase current error (e.g., $611_1$) or a respective modulated inverse phase current error (e.g., $613_1$), which change may in turn be caused by a change in the phase current error 603, which change may in turn be caused by a change in the corresponding phase current reference 518a, 518b, or 518c, the switching event allows the corresponding single-phase output signal on the respective phase output line (e.g., 502A) to track the corresponding phase current reference 518a, 518b, or 518c.

This tracking occurs because the switching event, under the control of the hysteretic controller 504, causes the corresponding single-phase output signal collectively generated on the respective phase output line (e.g., 502A) by the one H-bridge (e.g., $508A_1$) and the other H-bridges (e.g., $508A_2$-$508A_n$) with which the one H-bridge is cascaded to decrease in voltage, such that the corresponding single-phase output signal is equal in voltage to a predetermined voltage level, when the respective modulated phase current error (e.g., $611_1$) or the respective modulated inverse phase current error (e.g., $613_1$) changes from being within the predetermined current range to being less than the predetermined lower current limit of the predetermined current range (corresponding to a decrease in the phase current error 603 caused by a decrease in the corresponding phase current reference 518a, 518b, or 518c). The decrease in voltage of the corresponding single-phase output signal occurs because the voltage between the output terminals 212 and 214 of the one H-bridge (e.g., $508A_1$) decreases in response to the change in the respective modulated phase current error (e.g., $611_1$) or the respective modulated inverse phase current error (e.g., $613_1$), as discussed above and shown in Table 1.

Conversely, the switching event, under the control of the hysteretic controller 504, causes the corresponding single-phase output signal collectively generated on the respective phase output line (e.g., 502A) by the one H-bridge (e.g., $508A_1$) and the other H-bridges (e.g., $508A_2$-$508A_n$) with which the one H-bridge is cascaded to increase in voltage, such that the corresponding single-phase output signal is equal in voltage to a predetermined voltage level, when the respective modulated phase current error (e.g., $611_1$) or the respective modulated inverse phase current error (e.g., $613_1$) changes from being within the predetermined current range to being greater than the predetermined upper current limit of the predetermined current range (corresponding to an increase in the phase current error 603 caused by an increase in the corresponding phase current reference 518a, 518b, or 518c). The increase in voltage of the corresponding single-phase output signal occurs because the voltage between the output terminals 212 and 214 of the one H-bridge (e.g., $508A_1$) increases in response to the change in the respective modulated phase current error (e.g., $611_1$) or the respective modulated inverse phase current error (e.g., $613_1$), as discussed above and shown in Table 1.

As will be further recognized by one of ordinary skill in the art upon review of the present application, the first hysteretic comparators $614_1$-$614_n$ and the second hysteretic comparators $616_1$-$616_n$ of the hysteretic controller 504 control the switching events of the respective H-bridges $508A_1$-$508A_n$, $508B_1$-$508B_n$, or $508C_1$-$508C_n$ such that the values of the respective modulated phase current errors $611_1$-$611_n$ and the values of the respective modulated inverse phase current errors $613_1$-$613_n$ are forced to about zero amperes (or to the center of the predetermined current range) upon any fluctuation in the respective modulated phase current errors $611_1$-$611_n$ or the respective modulated inverse phase current errors $613_1$-$613_n$ (and thus in the phase current error 603). This result occurs because, as discussed above and as shown in Table 1, each of the first hysteretic comparators $614_1$-$614_n$ and the second hysteretic comparators $616_1$-$616_n$ of the hysteretic controller 504 changes its output such that the voltage between the output terminals 212 and 214 of a respective one of the H-bridges $508A_1$-$508A_n$, $508B_1$-$508B_n$, or $508C_1$-$508C_n$ decreases when the modulated phase current error $611_1$-$611_n$ or modulated inverse phase current error $613_1$-$613_n$ received by the respective hysteretic comparator changes from being within the predetermined current range to being less than the predetermined lower current limit of the predetermined current range. Because the voltage between the output terminals 212 and 214 of the respective one of the H-bridges $508A_1$-$508A_n$, $508B_1$-$508B_n$, or $508C_1$-$508C_n$ decreases, the voltage of the single-phase output signal on the respective phase output line 502A, 502B, or 502C decreases. Consequently, the corresponding phase current feedback 520a, 520b, or 520c decreases, which in turn causes the phase current error 603 and thus the modulated phase current error $611_1$-$611_n$ or modulated inverse phase current error $613_1$-$613_n$ received by the respective hysteretic comparator to increase, thereby correcting the prior decrease in the modulated phase current error $611_1$-$611_n$ or modulated inverse phase current error $613_1$-$613_n$ received by the respective hysteretic comparator. Specifically, the corresponding current feedback circuit 506A, 506B, or 506C may be implemented such that the decrease in the corresponding phase current feedback 520a, 520b, or 520c typically forces the modulated phase current error $611_1$-$611_n$ or modulated inverse phase current error $613_1$-$613_n$ back to about zero (or to the center of the predetermined range).

Conversely, as discussed above and as shown in Table 1, each of the first hysteretic comparators $614_1$-$614_n$ and the second hysteretic comparators $616_1$-$616_n$ of the hysteretic controller 504 changes its output such that the voltage between the output terminals 212 and 214 of a respective one of the H-bridges $508A_1$-$508A_n$, $508B_1$-$508B_n$, or $508C_1$-$508C_n$ increases when the modulated phase current error $611_1$-$611_n$ or modulated inverse phase current error $613_1$-$613_n$ received by the respective hysteretic comparator changes from being within the predetermined current range to being greater than the predetermined upper current limit of the predetermined current range. Because the voltage between the output terminals 212 and 214 of the respective one of the H-bridges $508A_1$-$508A_n$, $508B_1$-$508B_n$, or $508C_1$-$508C_n$ increases, the voltage of the single-phase output signal on the respective phase output line 502A, 502B, or 502C increases. Consequently, the corresponding phase current feedback 520a, 520b, or 520c increases, which in turn causes the phase current error 603 and thus the modulated phase current error $611_1$-$611_n$ or modulated inverse phase current error $613_1$-$613_n$ received by the respective hysteretic comparator to decrease, thereby correcting the prior increase in the modulated phase current error $611_1$-$611_n$ or modulated inverse phase current error $613_1$-$613_n$ received by the respective hysteretic comparator. Specifically, the corresponding current feedback circuit 506A, 506B, or 506C may be implemented such that the increase in the corresponding phase current feedback 520a, 520b, or 520c typically forces the modulated phase current error $611_1$-$611_n$ or modulated inverse phase current error $613_1$-$613_n$ back to about zero (or to the center of the predetermined range).

Because the values of the modulated phase current errors $611_1$-$611_n$ and modulated inverse phase current errors $613_1$-$613_n$ are forced to about zero amperes (or to the center of the predetermined current range), the fluctuation of the modulated phase current errors $611_1$-$611_n$ and modulated inverse phase current errors $613_1$-$613_n$ from the predetermined current range may continue, thereby continuing to cause the switching events of the H-bridges $508A_1$-$508A_n$, $508B_1$-$508B_n$, or $508C_1$-$508C_n$ under the control of the hysteretic controller 504 in the manner described above.

The modulation of the phase current error 603 via the reference or triangular signals $619_1$-$619_n$ produced by the signal generators $618_1$-$618_n$ will now be explained in detail. The reference or triangular signals $619_1$-$619_n$ generated by the signal generators $618_1$-$618_n$ have a common amplitude, are periodic with a common frequency, and otherwise equal except that each of the reference or triangular signals $619_1$-$619_n$ has a phase different from the phase of each of the other reference or triangular signals $619_1$-$619_n$. In one implementation, the reference or triangular signal $619_2$ is shifted from the reference or triangular signal $619_1$ by 180/n degrees, where n is the number of cascaded H-bridges $508A_1$-$508A_n$, $508B_1$-$508B_n$, or $508C_1$-$508C_n$ in each phase output line 502A, 502B, and 502C. In this implementation, the reference or triangular signal $619_3$ is further shifted from the reference or triangular signal $619_2$ by an additional 180/n degrees, and so on for each successive one of the reference or triangular signals $619_1$-$619_n$. Because of this phase differential, each of the modulated phase current errors $611_1$-$611_n$ and each of the modulated inverse phase current errors $613_1$-$613_n$, respectively, is a phase-shifted version of each of the other modulated phase current errors $611_1$-$611_n$ and each of the other modulated inverse phase current errors $613_1$-$613_n$, respectively, such that each hysteretic modulator $608_1$-$608_n$ receives and processes a particular portion of the phase current error 603 at different times within a period corresponding to a frequency of the reference or triangular signals $619_1$-$619_n$. Thus, the switching events of the H-bridges $508A_1$-$508A_n$, $508B_1$-$508B_n$, or $508C_1$-$508C_n$ are based on, among other things, the phase current error 603 and the reference or triangular signals $619_1$-$619_n$. More particularly, the reference or triangular signals $619_1$-$619_n$ are separated in phase such that the switching events of the H-bridges $508A_1$-$508A_n$, $508B_1$-$508B_n$, or $508C_1$-$508C_n$ are separated from one another by corresponding non-zero time intervals. As will be recognized by one of ordinary skill in the art, the non-zero time intervals increase as the common amplitude of the reference or triangular signals $619_1$-$619_n$ increases. Appropriate sizing of the common amplitude of the reference or triangular signals $619_1$-$619_n$ prevents an excessive switching frequency of the single-phase output signal produced by the cascaded H-bridges $508A_1$-$508A_n$, $508B_1$-$508B_n$, or $508C_1$-$508C_n$ controlled by the hysteretic modulators $608_1$-$608_n$. As previously discussed, the signal generators $618_1$-$618_n$ may also generate non-triangular signals. Any set of n signals which are periodic and have phase relationships which cause the switching events of the H-bridges $508A_1$-$508A_n$, $508B_1$-$508B_n$, or $508C_1$-$508C_n$ to be separated from one another by non-zero time intervals may be employed in the hysteretic controller 504. For example, but not by way of limitation, the signals $619_1$-$619_n$ generated by signal generators $618_1$-$618_n$ may be square wave signals or sinusoidal signals.

Another alternative embodiment employs a time slice based controller (not shown in figures) in lieu of each signal generator $618_1$-$618_n$ to accomplish the interleaving of the switching events of the H-bridges $508A_1$-$508A_n$, $508B_1$-$508B_n$, or $508C_1$-$508C_n$. A time slice based controller provides each of the H-bridges $508A_1$-$508A_n$, $508B_1$-$508B_n$, or $508C_1$-$508C_n$ with a slice of time in a predetermined period in which the respective H-bridge is allowed to switch.

Figure 2:
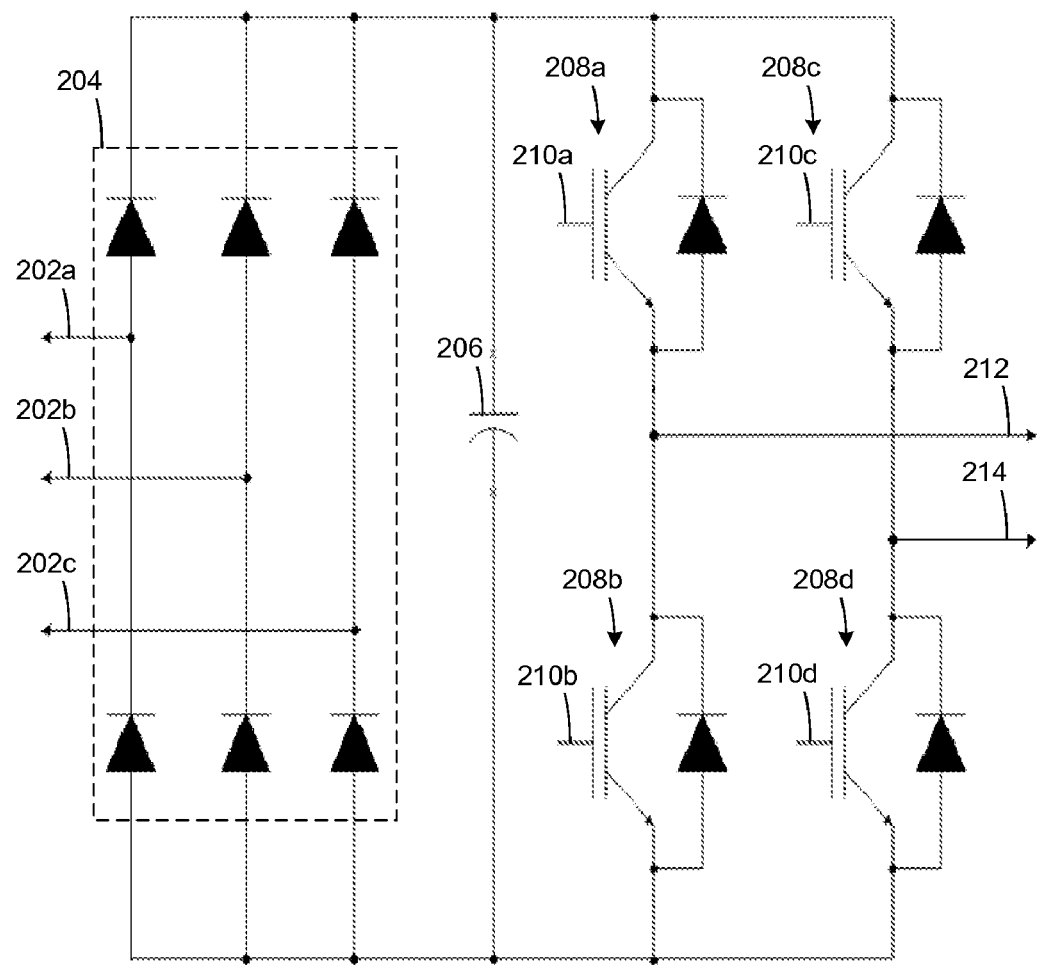
FIG. 2 is a circuit diagram of an H-bridge used in the conventional voltage drive system of FIG. 1.
Figure 3:
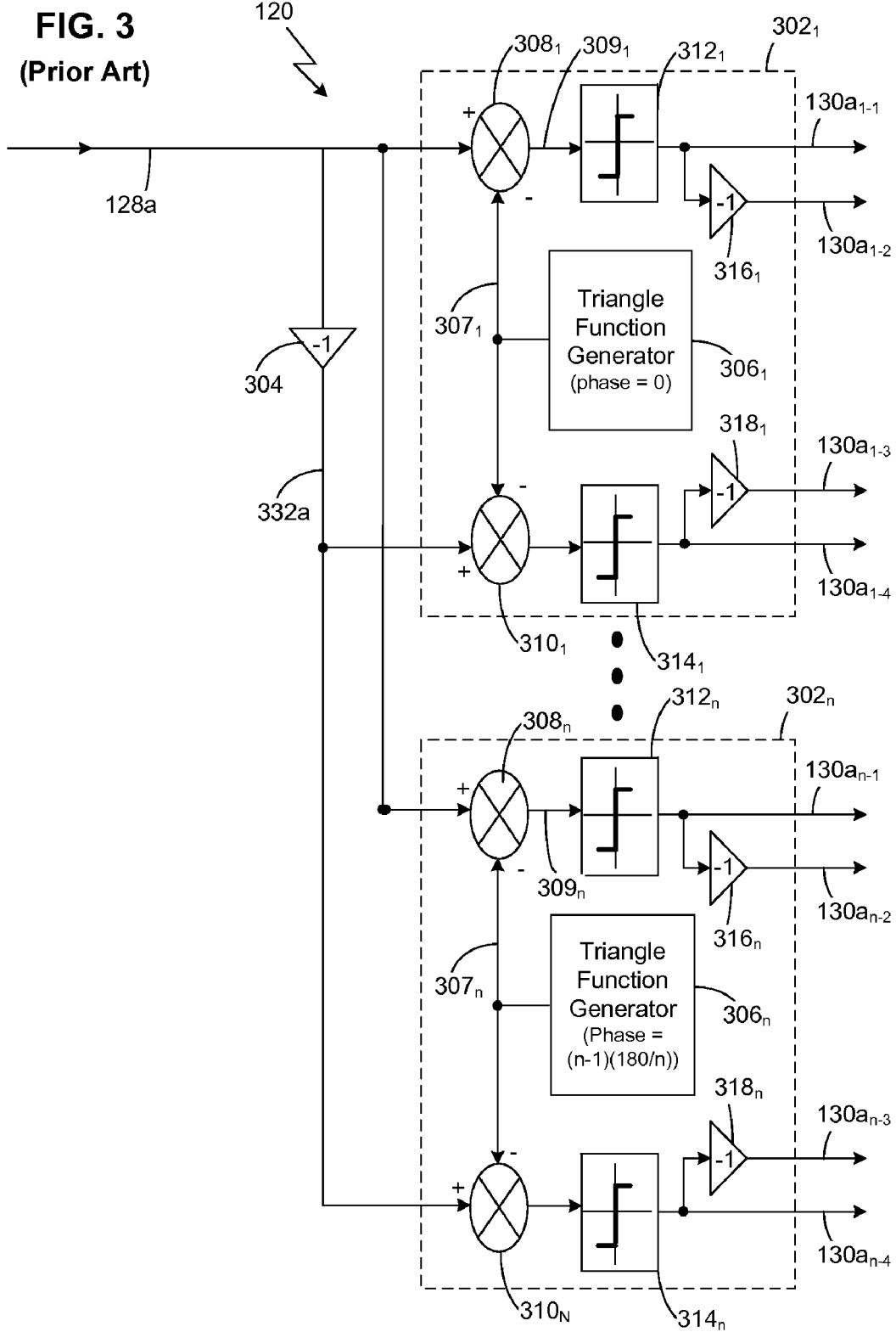
FIG. 3 is a block diagram of a deterministic controller used in the conventional voltage drive system of FIG. 1.

Because each reference or triangular signal $619_1$-$619_n$ is a zero-average signal, as discussed above, it will be recognized by one of ordinary skill in the art that the addition or subtraction of the respective reference or triangular signal $619_1$-$619_n$ to or from the regulated phase current error 605 and the inverse regulated phase current error 607, respectively, does not prevent the modulated phase current errors $611_1$-$611_n$ and the modulated inverse phase current errors $613_1$-$613_n$ (which correspond to the phase current error 603), respectively, from exceeding the predetermined current range less frequently at the low slew rate portions of the waveform of the phase current reference 518a, 518b, or 518c and more frequently at the high slew rate portions of the waveform of the phase current reference 518a, 518b, or 518c. Rather, the reference or triangular signals $619_1$-$619_n$ are simply used to enable the hysteretic controller 504 to scatter or space in time the switching events (e.g., the changes in the output voltages of the H-bridges $508A_1$-$508A_n$, $508B_1$-$508B_n$, or $508C_1$-$508C_n$ caused by changes in the respective sets of four gate inputs $522a_1$-$522a_n$, $522b_1$-$522b_n$, or $522c_1$-$522c_n$ to the H-bridges $508A_1$-$508A_n$, $508B_1$-$508B_n$, or $508C_1$-$508C_n$). As discussed with respect to FIG. 2, this temporal scattering of the switching events causes the effective switching rate at the output of the phase output line 502A, 502B, or 502C to be multiplied by 2·n, thereby allowing lower switching rates of each individual H-bridge $508A_1$-$508A_n$, $508B_1$-$508B_n$, or $508C_1$-$508C_n$.

Figure 7:
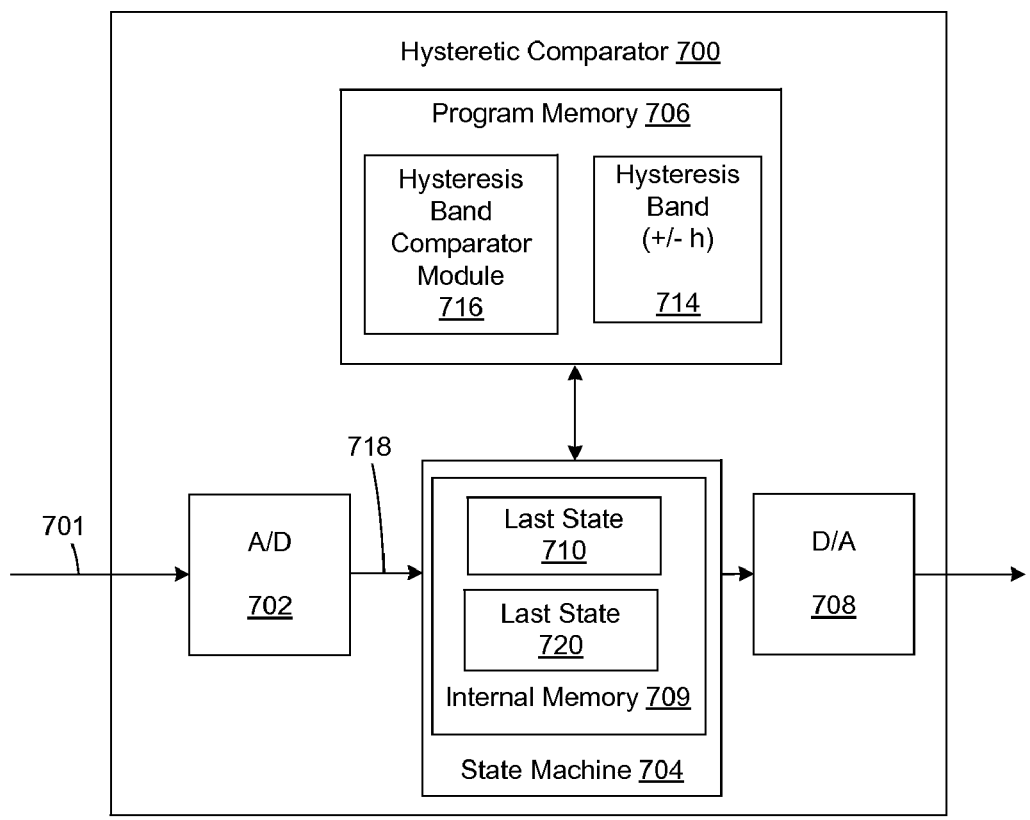
FIG. 7 is a block diagram of an exemplary hysteretic comparator that may be employed in the hysteretic non-deterministic controller of FIG. 6 in accordance with the present invention.

Referring now to FIG. 7, a block diagram of an exemplary hysteretic comparator 700 suitable for implementing each of the first hysteretic comparators $614_1$-$614_n$ and the second hysteretic comparators $616_1$-$616_n$ is shown. The hysteretic comparator 700 includes an analog-to-digital (A/D) converter 702, a state machine 704, a program memory 706, and a digital-to-analog (D/A) converter 708. The program memory 706 may be flash memory or other non-volatile memory device. The state machine 704 may be, for example, a central processing unit (CPU) having an internal memory 709 and operatively configured to access and execute instructions from program memory 706. The internal memory 709 may be, for example, an internal RAM, ROM, cache memory, flash memory or other memory storage device. In one implementation, the state machine 704, alone or in combination with one or more of the A/D converter 702, the program memory 706, and the D/A converter 708, may be implemented in hardware alone (e.g., using an Application Specific Integrated Circuit (ASIC) or a combination of a programmable logic array and discrete components).

As shown in FIG. 7, the hysteretic comparator 700 may store a last state 710 of the output of the state machine 704 in the internal memory 709 or in the program memory 706. The program memory 706 includes a hysteresis band module 714 that stores the predetermined lower current limit (−h) and predetermined upper current limit (+h) of the predetermined current range or hysteresis band (+/−h) discussed above with respect to FIG. 6. The program memory 706 also includes a hysteresis band comparator module 716 which includes instructions accessible and executable by the state machine 704 (or the CPU therein) for comparing a digital signal 718 input to the state machine 704 to the predetermined current range or hysteresis band (+/−h) stored in memory 706 in the manner described above with respect to FIG. 6. The executable instructions may correspond to portions of the steps shown below in the process flow of FIG. 12. Alternatively, one or more of the predetermined lower current limit (−h) and predetermined upper current limit (+h) of the predetermined current range or hysteresis band (+/−h) and the executable instructions for comparing an input to the state machine 704 to the predetermined current range or hysteresis band (+/−h) may be stored in the internal memory 709 of the state machine 704.

The A/D converter 702 receives a respective one 701 of the modulated phase current errors (e.g., $611_1$ or $611_n$) or modulated inverse phase current errors (e.g., $613_1$ or $613_n$) and converts the respective modulated phase current error or modulated inverse phase current error 701 into the digital signal 718. The digital signal 718 is then output by the A/D converter 702 to the state machine 704. The state machine 704 accesses the executable instructions stored in the hysteresis band comparator module 716, and the predetermined lower current limit and predetermined upper current limit of the predetermined current range or hysteresis band as stored in the hysteresis band module 714 to process the digital signal 718 and, if stored in the internal memory 709 or program memory 706 as discussed above, the last state 710 of the output of the state machine 704. The state machine 704 performs this processing to generate a next state 720 of the output of the state machine 704. The next state 720 of the output of the state machine 704 is input to the D/A converter 708 to generate a gate input (e.g., $522a_{1-1}$ as shown in FIG. 6) of the respective set of four gate inputs $522a_1$, $522a_n$, $522b_1$, $522b_n$, $522c_1$ or $522c_n$ to a respective one of the H-bridges $508A_1$, $508A_n$, $508B_1$, $508B_n$, $508C_1$ or $508C_n$ in the manner described herein.

Figure 4:
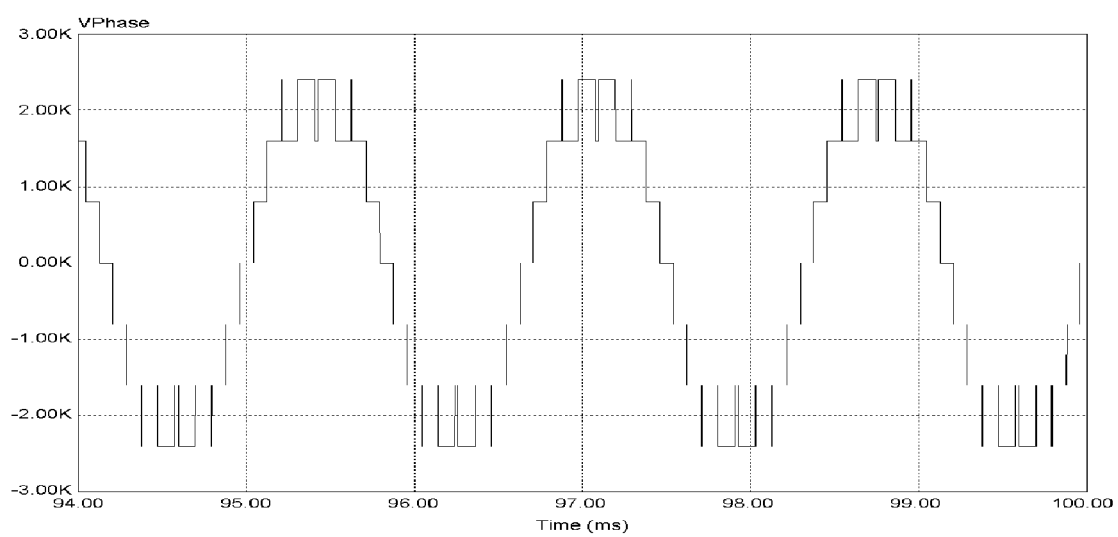
FIG. 4 illustrates a voltage waveform of a single-phase output signal synthesized using the conventional voltage drive system of FIG. 1.
Figure 8:
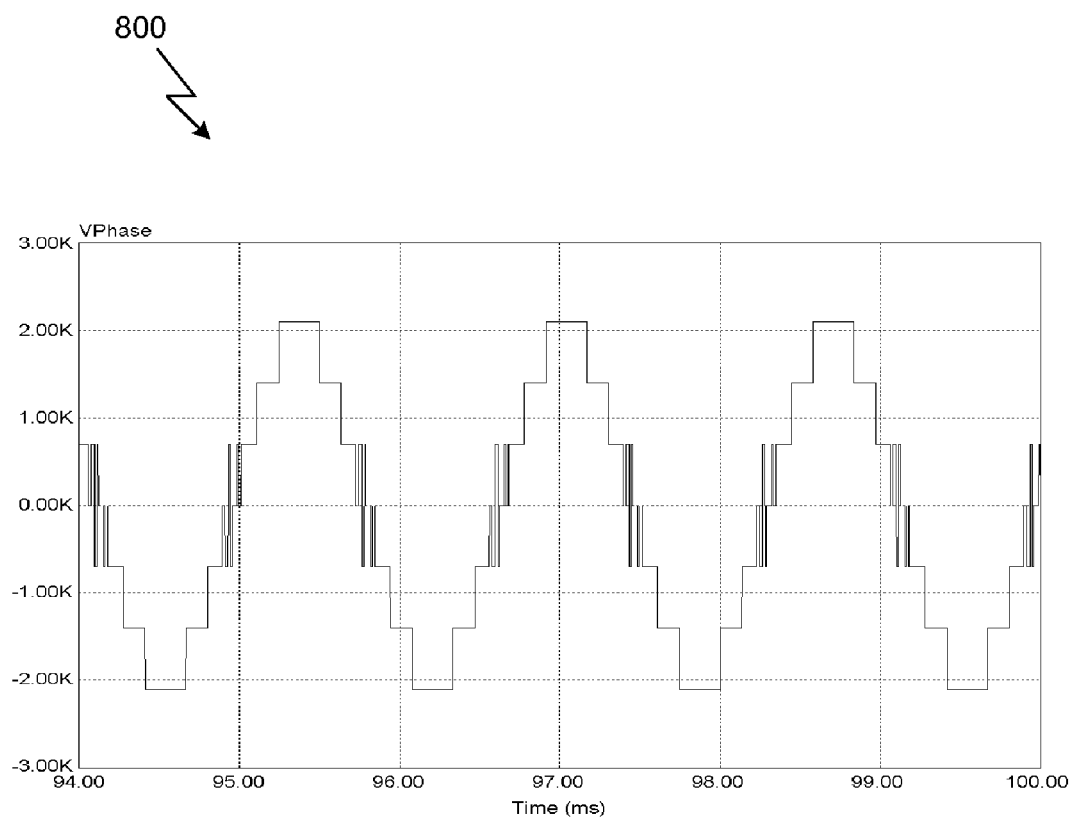
FIG. 8 illustrates a voltage waveform of a single-phase output signal synthesized by a voltage drive system consistent with the present invention, such as the voltage drive system of FIG. 5 or FIG. 9.

FIG. 8 illustrates a voltage waveform 800 of a single-phase output signal synthesized and output on a phase output line 502A, 502B, or 502C by a voltage drive system consistent with the present invention (such as, for example, the voltage drive system 500 of FIGS. 5-7) that employs a hysteretic non-deterministic controller (e.g., 504 in FIG. 5). As compared to the output waveform 400 of FIG. 4 generated by conventional voltage drive systems 100 employing a deterministic controller 120, the voltage waveform 800 is considerably smoother because the switching rates of the H-bridges $508A_1$-$508A_n$, $508B_1$-$508B_n$, or $508C_1$-$508C_n$ are increased by the hysteretic non-deterministic controller 504 at times corresponding to the zero crossings of the voltage waveform 800 (and the waveform of the associated phase current reference 518a, 518b, or 518c) and decreased at times corresponding to the peaks of the voltage waveform 800 (and the waveform of the associated phase current reference 518a, 518b, or 518c). Moreover, switching losses are reduced and the clearly defined tones in the spectrum (not shown) of the single-phase output signal are reduced because of the spreading of energy resulting from the variation of the switching rates of the H-bridges $508A_1$-$508A_n$, $508B_1$-$508B_n$, or $508C_1$-$508C_n$ by the hysteretic non-deterministic controller 504.

Figure 9:
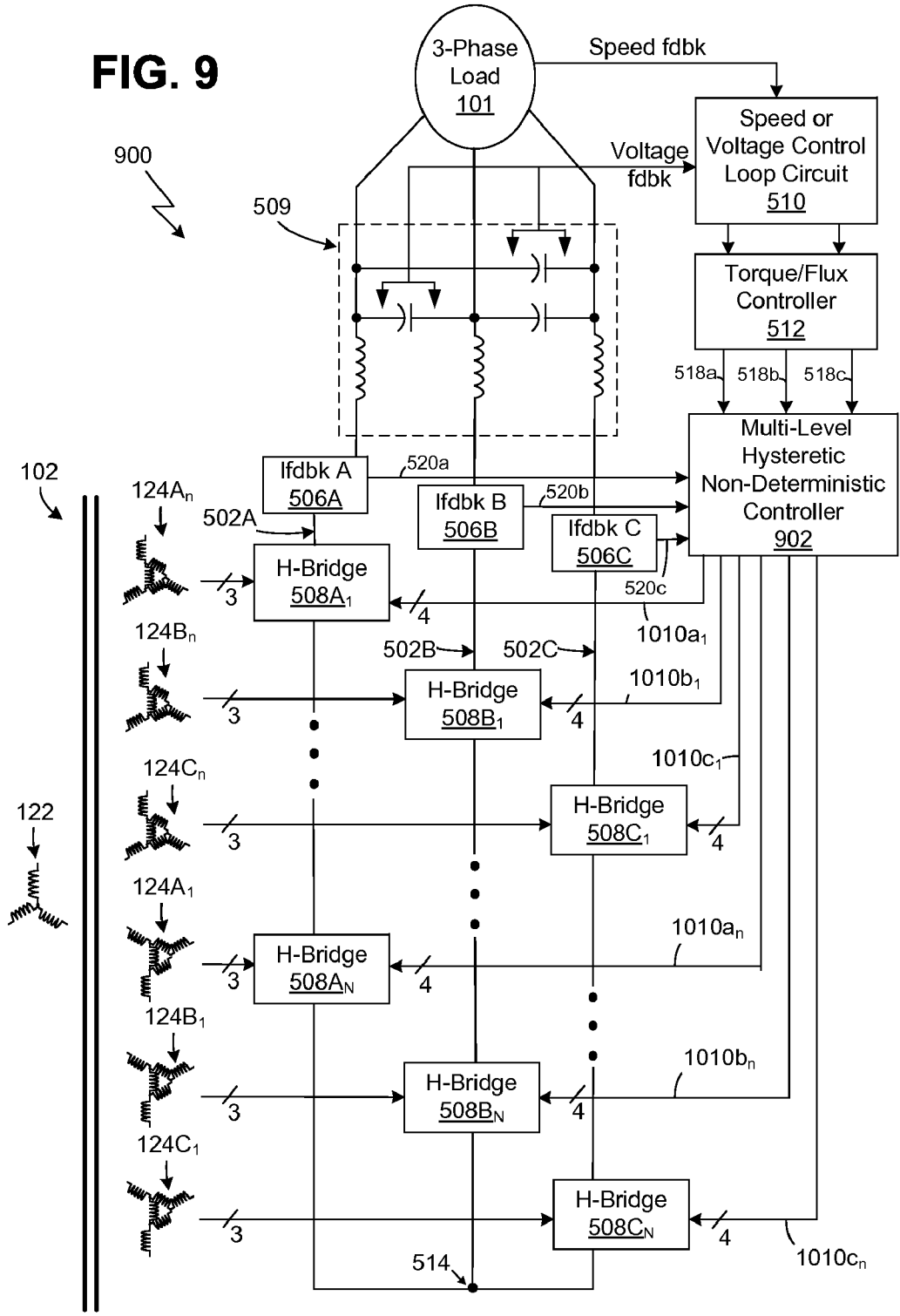
FIG. 9 is a block diagram of another voltage drive system consistent with the present invention.

FIG. 9 is a block diagram of another voltage drive system 900 consistent with the present invention. The voltage drive system 900 produces a similar single-phase output signal voltage waveform as that depicted in FIG. 8 on each of the phase output lines 502A, 502B, and 502C. The voltage drive system 900 includes the components of the voltage drive system 500 except that the hysteretic controller 504 is replaced with a multi-level hysteretic non-deterministic controller 902 (hereinafter the multi-level hysteretic controller 902). Each of the common components of the voltage drive system 500 and the voltage drive system 900 operates in the same manner in each system 500 and 900 except as altered by the multi-level hysteretic controller 902 in the manner described below.

Figure 10:
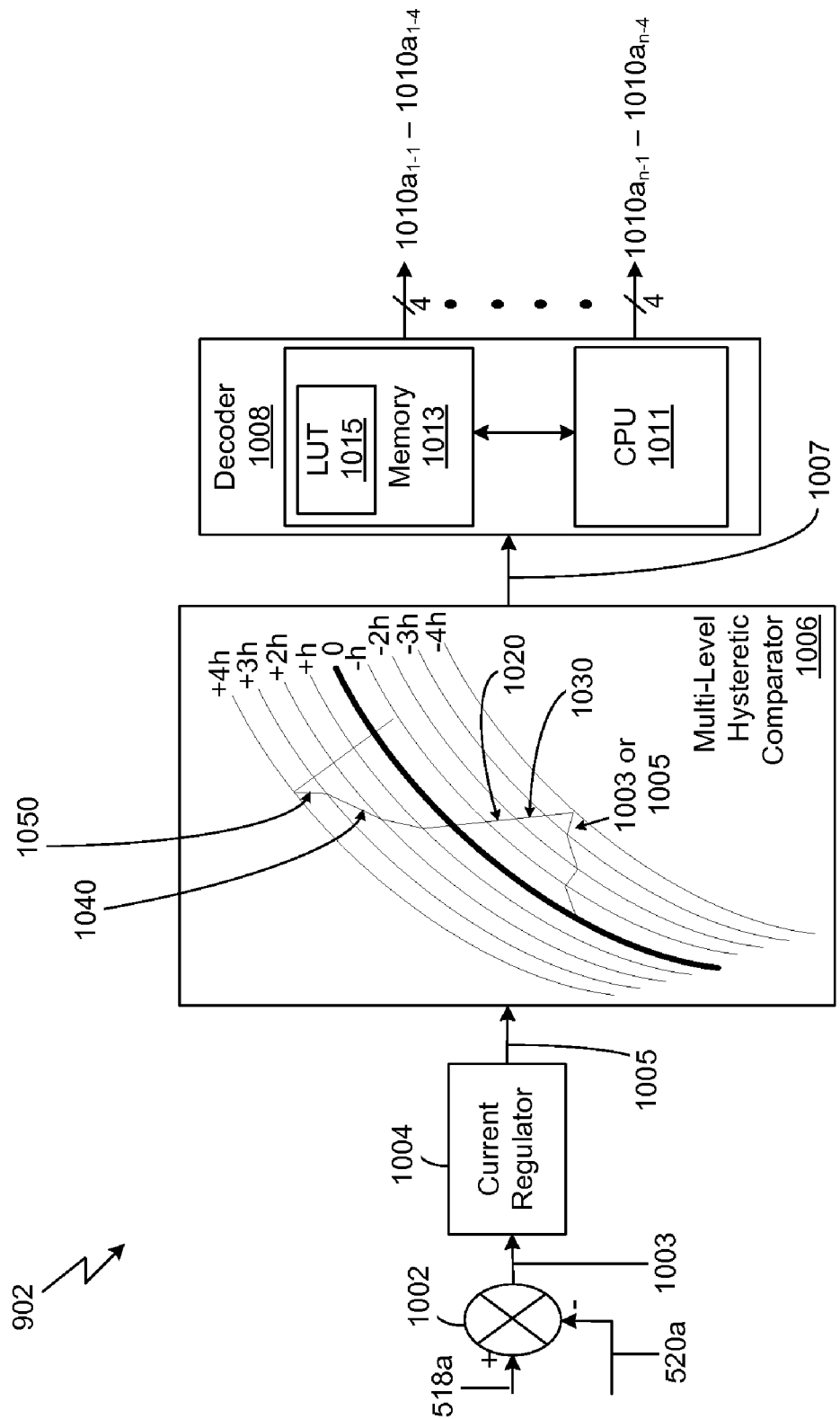
FIG. 10 is a block diagram of an exemplary multi-level hysteretic controller employed in the voltage drive system of FIG. 9 in accordance with the present invention.

FIG. 10 illustrates a block diagram of the multi-level hysteretic controller 902. The components of the multi-level hysteretic controller 902 shown in FIG. 10 correspond to the components for controlling one group of H-bridges $508A_1$-$508A_n$, $508B_1$-$508B_n$, or $508C_1$-$508C_n$ to generate a single-phase output signal on a corresponding one of the phase output lines 502A, 502B, or 502C in accordance with the present invention. However, two duplicate sets of components as shown in FIG. 10 may be employed in the multi-level hysteretic controller 902 to control the other two groups of H-bridges in a similar manner. Therefore, for simplicity, only those components corresponding to one group of H-bridges $508A_1$-$508A_n$, $508B_1$-$508B_n$, or $508C_1$-$508C_n$ and one of the phase output lines 502A, 502B, or 502C are shown and discussed herein. For each phase output line 502A, 502B, and 502C, the multi-level hysteretic controller 902 includes an adder 1002, a proportional integral current regulator 1004, a multi-level hysteretic comparator 1006, and a decoder 1008.

In operation, for each phase output line 502A, 502B, and 502C, the adder 1002 receives as input a respective one of the phase current references 518a, 518b, and 518c from the torque/flux controller 512 and a respective one of the phase current feedbacks 520a, 520b, and 520c from a respective one of the current feedback circuits 506A, 506B, and 506C. The adder 1002 computes a difference between the received phase current reference 518a, 518b, or 518c and the received phase current feedback 520a, 520b, or 520c to generate a phase current error 1003, which is output to the proportional integral current regulator 1004. The output of the proportional integral current regulator 1004 is based on and proportional to the phase current error 1003. The output of the proportional integral current regulator 1004 will be referred to as a regulated phase current error 1005. The regulated phase current error 1005 is input to the multi-level hysteretic comparator 1006. In one implementation, the proportional integral current regulator 1004 may be omitted and the phase current error 1003 input directly to the multi-level hysteretic comparator 1006.

The multi-level hysteretic comparator 1006 receives the regulated phase current error 1005 (or phase current error 1003) and generates a drive-state output 1007 corresponding to one of a plurality of predetermined voltage levels based on the phase current error 1003 or 1005. Specifically, the multi-level hysteretic comparator 1006 compares the phase current error 1003 or 1005 to a plurality of predetermined current ranges or hysteresis bands (e.g., (+/−h, +/−2 h, +/−3 h and +/−4 h). In one implementation, the number of predetermined current ranges in the plurality of predetermined current ranges is equal to 2·n (where n represents the total number of H-bridges), although any suitable number of predetermined current ranges or hysteresis bands may be used. Each predetermined current range is defined by a predetermined lower current limit, such as a minimum current, and a predetermined upper current limit, such as a maximum current. In one implementation, the predetermined lower current limit of each respective predetermined current range is the negative of the predetermined upper current limit of the respective predetermined current range. The magnitudes of the predetermined lower current limits and the predetermined upper current limits increase for each successive predetermined current range. Thus, a second predetermined current range includes a first predetermined current range, a third predetermined current range includes the first predetermined current range and the second predetermined current range, and so forth. In one implementation, the magnitudes of the predetermined lower current limits and the predetermined upper current limits are successive integer multiples of the magnitude of the predetermined lower current limit and predetermined upper current limit of the first predetermined current range. For example, in this implementation, the first predetermined current range or hysteresis band spans the current values –h to +h, the second predetermined current range or hysteresis band spans the current values –2 h to +2 h, the third predetermined current range spans the current values –3 h to +3 h, and so forth. In FIG. 10, the predetermined current ranges or hysteresis bands (e.g., (+/–h, +/–2 h, +/–3 h and +/–4 h) as implemented in the multi-level hysteretic comparator 1006 are graphically illustrated in comparison to an exemplary phase current error 1003 or 1005.

The multi-level hysteretic comparator 1006 will generate the same drive-state output 1007 it last generated (e.g., for a previous phase current error 1003 or regulated phase current error 1005) if either of the following circumstances exist: (i) the regulated phase current error 1005 (or phase current error 1003) received at the multi-level hysteretic comparator 1006 is within one of the predetermined current ranges and has not exited any of the predetermined current ranges since the last drive-state output 1007 was generated by the multi-level hysteretic comparator 1006, or (ii) the regulated phase current error 1005 received by the multi-level hysteretic comparator 1006 is not within any of the predetermined current ranges and has not exited any of the predetermined current ranges since the last drive-state output 1005 was generated. In this circumstance, the multi-level hysteretic comparator 1006 has already generated a drive-state output 1007 corresponding to a maximum or minimum one of the predetermined voltage levels that a respective H-bridge (e.g., 508A$_1$) may be switched to generate.

If, however, the regulated phase current error 1005 (or phase current error 1003) changes from being within one of the predetermined current ranges (e.g., at point 1020 in the +/–2 h range) to being outside of that predetermined current range (e.g., at point 1030 outside the +/–2 h range), the multi-level hysteretic comparator 1006 will change the drive-state output 1007 to effectively cause, as described in further detail below, a switching event or events of the cascaded H-bridges 508A$_1$-508A$_n$, 508B$_1$-508B$_n$, or 508C$_1$-508C$_n$ such that the group of cascaded H-bridges collectively generates the corresponding single-phase output signal on the respective phase output line 502A, 502B, or 502C to have a voltage corresponding to the one predetermined voltage level to which the changed drive-state output 1007 corresponds. Thus, and as described in further detail herein, the subsequent phase current error 1003 is driven within the predetermined current range or hysteresis band (e.g., +/–2 h range).

Specifically, when the regulated phase current error 1005 (or phase current error 1003) changes from being within one of the predetermined current ranges (e.g., at point 1020 in the +/–2 h range) to being less than the predetermined lower current limit (e.g., at point 1030, which is less than –2 h) of that predetermined current range (e.g., +/–2 h), the multi-level hysteretic comparator 1006 will change the drive-state output 1007 such that the drive-state output 1007 corresponds to a next higher one of the plurality of predetermined voltage levels in order to drive the phase current error 1003 back within that predetermined current range (e.g., +/–2 h) and towards zero voltage. Conversely, when the regulated phase current error 1005 (or phase current error 1003) changes from being within one of the predetermined current ranges (e.g., at point 1040 in the +/–2 h range) to being greater than the predetermined upper current limit (e.g., at point 1050, which is greater than +2 h) of that predetermined current range (e.g., +/–2 h), the multi-level hysteretic comparator 1006 will change the drive-state output 1007 such that the drive-state output 1007 corresponds to a next lower one of the plurality of predetermined voltage levels in order to drive the phase current error 1003 back within that predetermined current range (e.g., +/–2 h) and towards zero voltage. Control of the drive-state output 1007 in this manner enables the corresponding single-phase output signal on the respective phase output line (e.g., 502A) to track the corresponding phase current reference 518$a$, 518$b$, or 518$c$, as discussed in detail herein.

Figure 11:
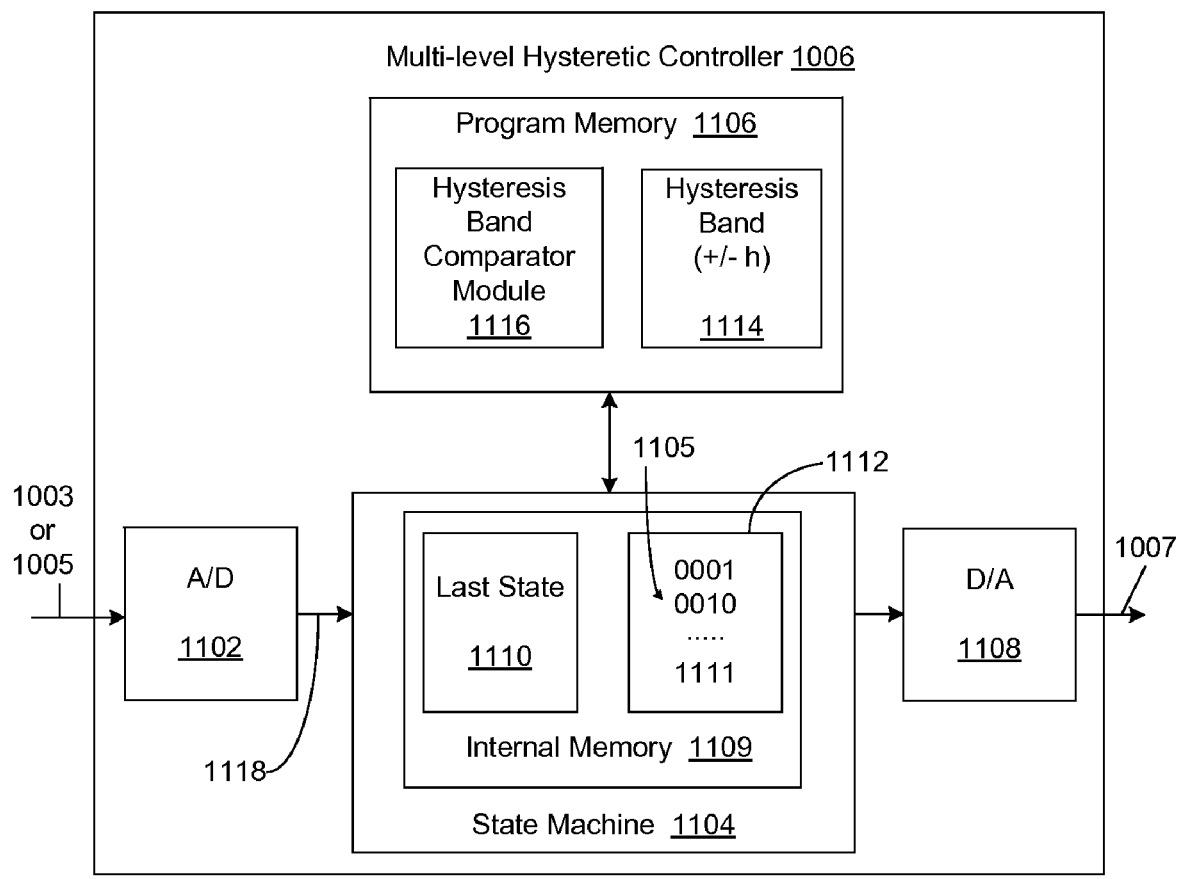
FIG. 11 is a block diagram of an exemplary multi-level hysteretic comparator employed in the controller of FIG. 10 in accordance with the present invention.

FIG. 11 illustrates a block diagram of the multi-level hysteretic comparator 1006 as employed in each of the phase output lines 502A, 502B, or 502C. The multi-level hysteretic comparator 1006 includes an analog-to-digital (A/D) converter 1102, a state machine 1104, a program memory 1106, and a digital-to-analog (D/A) converter 1108. The program memory 1106 may be flash memory or other non-volatile memory. The state machine 1104 may be, for example, a central processing unit (CPU) having an internal memory 1109 and operatively configured to access and execute instructions from program memory 1106. The internal memory 1109 may be, for example, RAM, ROM, cache memory, flash memory or other memory storage device. In one implementation, the state machine 1104, alone or in combination with one or more of the A/D converter 1102, program memory 1106, and D/A converter 1108, may be implemented in hardware alone (e.g., using an ASIC or a combination of a programmable logic array and discrete components).

In one implementation, the multi-level hysteretic comparator 1006 may store a last state 1110 of the output of the state machine 1104 in the internal memory 1109 or in the program memory 1106. Moreover, in one implementation, the multi-level hysteretic comparator 1006 may store, in the internal memory 1109 or in the program memory 1106, a list 1112 of possible next states of the output of the state machine 1104. The program memory 1106 includes a hysteresis band module 1114 that stores the predetermined lower current limits (e.g., –h, –2 h, –3 h and –4 h) and predetermined upper current limits (e.g., +h, +2 h, +3 h and +4 h) of the plurality of predetermined current ranges or hysteresis bands discussed above with respect to FIG. 10. The program memory 1106 also includes a hysteresis band comparator module 1116 which includes executable instructions for comparing a digital signal 1118 input to the state machine 1104 to the plurality of predetermined current ranges or hysteresis bands (e.g., +/–h, +/–2 h, +/–3 h and +/–4 h) in the manner described above with respect to FIG. 10. The executable instructions may correspond to portions of the steps shown below in the process flow of FIG. 13. Alternatively, one or more of the predetermined lower current limits and predetermined upper current limits of the plurality of predetermined current ranges or hysteresis bands and the executable instructions for comparing an input to the state machine 1104 to the plurality of predetermined current ranges or hysteresis bands may be stored in the internal memory 1109 of the state machine 1104.

The A/D converter 1102 receives the regulated phase current error 1005 (or the phase current error 1003 if the current regulator 1004 is omitted) and converts the regulated phase current error 1005 (or phase current error 1003) into the digital signal 1118. The digital signal 1118 is then output by the A/D converter 1102 to the state machine 1104. The state machine 1104 accesses the executable instructions stored in the hysteresis band comparator module 1116, and the predetermined lower current limits and predetermined upper current limits of the plurality of predetermined current ranges or hysteresis bands (e.g., +/−h, +/−2 h, +/−3 h and +/−4 h) as stored in the hysteresis band module 1114 as well as the last state 1110 of the output of the state machine 1104, and the list 1112 of possible next states of the output of the state machine 1104 to process the digital signal 1118. The state machine 1104 performs this processing to generate a next state 1105 of the output of the state machine 1105. The next state (e.g., 1105) of the output of the state machine 1104 corresponds to one of the possible next states of the output of the state machine 1104 included in the list 112. The next state of the output of the state machine 1104 is input to the D/A converter 1108 to generate the drive-state output 1007 in the manner described above.

Referring back to FIG. 10, the decoder 1008 generates a respective set of four gate inputs $1010a_1\text{-}1010a_n$, $1010b_1\text{-}1010b_n$, or $1010c_n\text{-}1010c_n$ for each H-bridge of the respective group of H-bridges $508A_1\text{-}508A_n$, $508B_1\text{-}508B_n$, or $508C_1\text{-}508C_n$ that are cascaded together to produce a respective single-phase output signal (such as depicted in FIG. 8). Each gate input of the respective set of four gate inputs $1010a_1\text{-}1010a_n$, $1010b_1\text{-}1010b_n$, or $1010c_n\text{-}1010c_n$ (e.g., four gate inputs referenced as $1010a_{1\text{-}1}\text{-}1010a_{1\text{-}4}$) is input to the gate or base of a corresponding one power switch (e.g., 108a-108d) of the respective H-bridges (e.g., $508A_1$). The decoder 1008 generates the respective sets of four gate inputs $1010a_1\text{-}1010a_n$, $1010b_1\text{-}1010b_n$, or $1010c_1\text{-}1010c_n$ based on the drive-state output 1007 so that the group of cascaded H-bridges $508A_1\text{-}508A_n$, $508B_1\text{-}508B_n$, or $508C_1\text{-}508C_n$ collectively generate the single-phase output signal on the phase output line 502A, 502B, or 502C to have a voltage equal to the one predetermined voltage level to which the drive-state output 1007 corresponds.

Accordingly, when the drive-state output 1007 is changed to correspond to a next lower one of the plurality of predetermined voltage levels, the decoder 1008 changes the respective sets of four gate inputs $1010a_1\text{-}1010a_n$, $1010b_1\text{-}1010b_n$, or $1010c_1\text{-}1010c_n$ such that the voltage between the output terminals 212 and 214 of at least one of the cascaded H-bridges (e.g., $508A_1$) decreases. Conversely, when the drive-state output 1007 is changed to correspond to a next higher one of the plurality of predetermined voltage levels, the decoder 1008 changes the respective sets of four gate inputs $1010a_1\text{-}1010a_n$, $1010b_1\text{-}1010b_n$, or $1010c_1\text{-}1010c_n$ such that the voltage between the output terminals 212 and 214 of at least one of the cascaded H-bridges (e.g., $508A_1$) increases.

Because the voltage of the single-phase output signal generated by a cascaded group of H-bridges $508A_1\text{-}508A_n$, $508B_1\text{-}508B_n$, or $508C_1\text{-}508C_n$ is equal to the sum of the voltages between the output terminals 212 and 214 of each of the H-bridges $508A_1\text{-}508A_n$, $508B_1\text{-}508B_n$, or $508C_1\text{-}508C_n$ that are cascaded together, the same voltage of the single-phase output signal may be obtained from a number of different states of the cascaded H-bridges $508A_1\text{-}508A_n$, $508B_1\text{-}508B_n$, or $508C_1\text{-}508C_n$, where a state of the cascaded group of H-bridges $508A_1\text{-}508A_n$, $508B_1\text{-}508B_n$, or $508C_1\text{-}508C_n$ corresponds to a particular combination or state of the plurality of sets of four gate inputs $1010a_1\text{-}1010a_n$, $1010b_1\text{-}1010b_n$, or $1010c_1\text{-}1010c_n$ generated by the decoder 1008 of the multi-level hysteretic controller 902 to switch the respective H-bridge (e.g., $508A_1$). Thus, while the decoder 1008 may generate the plurality of sets of four gate inputs $1010a_1\text{-}1010a_n$, $1010b_1\text{-}1010b_n$, and $1010c_1\text{-}1010c_n$ based solely on the drive-state output 1007. In one implementation, the decoder 1008 generates the plurality of sets of four gate inputs $1010a_1\text{-}1010a_n$, $1010b_1\text{-}1010b_n$, and $1010c_1\text{-}1010c_n$ based on the drive-state output 1007 and a last state of the cascaded group of H-bridges $508A_1\text{-}508A_n$, $508B_1\text{-}508B_n$, or $508C_1\text{-}508C_n$.

To achieve this functionality, the decoder 1008 may include a processor (CPU) 1011 and a memory 1013 holding a look-up table (LUT) 1015. The look-up table 1015 stores each configuration of the plurality of sets of four gate inputs $1010a_1\text{-}1010a_n$, $1010b_1\text{-}1010b_n$, or $1010c_1\text{-}1010c_n$ for a group of cascaded H-bridges $508A_1\text{-}508A_n$, $508B_1\text{-}508B_n$, or $508C_1\text{-}508C_n$. In this implementation, the processor 1011 is operatively configured to use the received drive-state output 1007 from the multi-level hysteretic comparator 1006 to index the look-up table 1015 to identify the state or combination of gate inputs (e.g., $1010a_1\text{-}1010a_n$) for switching the corresponding cascaded group of H-bridges (e.g., $508A_1\text{-}508A_n$). In one implementation, the look-up table 1015 stores multiple redundant states or combinations of gate inputs (e.g., $1010a_1\text{-}1010a_n$) that each correspond to the same drive-state output 1007 and cause the corresponding cascaded group of H-bridges (e.g., $508A_1\text{-}508A_n$) to collectively output the same voltage for the respective single-phase output signal. In this implementation, the decoder 1008 stores the last state of the cascaded group of H-bridges (e.g., $508A_1\text{-}508A_n$) and is configured to select one of the redundant states or combinations for output to the cascaded group of H-bridges (e.g., $508A_1\text{-}508A_n$) that limits or minimizes the number of power switches 108a-108d within the cascaded group of H-bridges (e.g., $508A_1\text{-}508A_n$) that need to be switched from the last state to the redundant state.

For example, the look-up table 1015 may be implemented consistent with Table 2 as shown and described below. Table 2 indicates, for a cascaded group of two H-bridges $508A_1$ and $508A_n$, the voltage of the single-phase output signal on the phase output line 502A, 502B, or 502C as caused by each possible state of the respective sets of four gate inputs (e.g., $1010a_1$ and $1010a_n$) to the two H-bridges $508A_1$ and $508A_n$ generated by the decoder 1008.

TABLE 2

| | Gate inputs to H-bridge $508A_1$ power switches 108a to 108d, respectively ($1010a_{1\text{-}1}$ to $1010a_{1\text{-}4}$, respectively) | | | | Gate inputs to H-bridge $508A_n$ power switches 108a to 108d, respectively ($1010a_{n\text{-}1}$ to $1010a_{n\text{-}4}$, respectively) | | | | |
|---|---|---|---|---|---|---|---|---|---|
| State | To 108a | To 108b | To 108c | To 108d | To 108a | To 108b | To 108c | To 108d | Voltage of Single-Phase Output Signal |
| 0 | 0 | 1 | 0 | 1 | 0 | 1 | 0 | 1 | ZERO |
| 1 | 0 | 1 | 0 | 1 | 0 | 1 | 1 | 0 | − SUPPLY VOLTAGE |
| 2 | 0 | 1 | 0 | 1 | 1 | 0 | 0 | 1 | + SUPPLY VOLTAGE |

TABLE 2-continued

| | Gate inputs to H-bridge $508A_1$ power switches 108a to 108d, respectively ($1010a_{1-1}$ to $1010a_{1-4}$, respectively) | | | | Gate inputs to H-bridge $508A_n$ power switches 108a to 108d, respectively ($1010a_{n-1}$ to $1010a_{n-4}$, respectively) | | | | |
|---|---|---|---|---|---|---|---|---|---|
| State | To 108a | To 108b | To 108c | To 108d | To 108a | To 108b | To 108c | To 108d | Voltage of Single-Phase Output Signal |
| 3 | 0 | 1 | 0 | 1 | 1 | 0 | 1 | 0 | ZERO |
| 4 | 0 | 1 | 1 | 0 | 0 | 1 | 0 | 1 | − SUPPLY VOLTAGE |
| 5 | 0 | 1 | 1 | 0 | 0 | 1 | 1 | 0 | −2 · SUPPLY VOLTAGE |
| 6 | 0 | 1 | 1 | 0 | 1 | 0 | 0 | 1 | ZERO |
| 7 | 0 | 1 | 1 | 0 | 1 | 0 | 1 | 0 | − SUPPLY VOLTAGE |
| 8 | 1 | 0 | 0 | 1 | 0 | 1 | 0 | 1 | + SUPPLY VOLTAGE |
| 9 | 1 | 0 | 0 | 1 | 0 | 1 | 1 | 0 | ZERO |
| 10 | 1 | 0 | 0 | 1 | 1 | 0 | 0 | 1 | +2 · SUPPLY VOLTAGE |
| 11 | 1 | 0 | 0 | 1 | 1 | 0 | 1 | 0 | + SUPPLY VOLTAGE |
| 12 | 1 | 0 | 1 | 0 | 0 | 1 | 0 | 1 | ZERO |
| 13 | 1 | 0 | 1 | 0 | 0 | 1 | 1 | 0 | − SUPPLY VOLTAGE |
| 14 | 1 | 0 | 1 | 0 | 1 | 0 | 0 | 1 | + SUPPLY VOLTAGE |
| 15 | 1 | 0 | 1 | 0 | 1 | 0 | 1 | 0 | ZERO |

As shown in Table 2, for example, the voltage of the single-phase output signal on the phase output line 502A, 502B, or 502C is equal to the supply voltage to the two H-bridges $508A_1$ and $508A_n$ when the respective sets of four gate inputs (e.g., $1010a_1$ and $1010a_n$) are in state 8. Thus, if the multi-level hysteretic comparator 1006 changes the drive-state output 1007 to correspond to a predetermined voltage level equal to zero, the decoder 1008 may accomplish the required change in the plurality of sets of four gate inputs (e.g., $1010a_1$ and $1010a_n$) by changing the plurality of sets of four gate inputs (e.g., $1010a_1$ and $1010a_n$) to one of states 0, 3, 6, 9, 12, and 15.

Changing the plurality of sets of four gate inputs (e.g., $1010a_1$ and $1010a_n$) to state 0, for example, only requires changing two gate inputs of the first set of four gate inputs (e.g., $1010a_1$). Specifically, the gate inputs $1010a_{1-1}$ and $1010a_{1-4}$ to power switches 108a and 108b of H-bridge $508A_1$ must be changed from logic "1" and logic "0," respectively, to logic "0" and logic "1," respectively. Thus, a switching event of the H-bridge $508A_1$ occurs, but no switching event of the H-bridge $508A_n$ occurs.

However, changing the plurality of sets of four gate inputs (e.g., $1010a_1$ and $1010a_n$) to state 6, for example, requires changing all four gate inputs of the first set of four gate inputs (e.g., $1010a_1$) and two gate inputs of the second set of four gate inputs (e.g., $1010a_n$). Specifically, the gate inputs $1010a_{1-0}$, $1010a_{1-1}$, $1010a_{1-2}$, and $1010a_{1-3}$ to power switches 108a, 108b, 108c, and 108d of H-bridge $508A_1$ must be changed from logic "1," logic "0," logic "0," and logic "1," respectively, to logic "0," logic "1," logic "1," and logic "0," respectively. Thus, a switching event of the H-bridge $508A_1$ occurs. Similarly, the gate inputs $1010a_{n-0}$ and $1010a_{n-1}$ to power switches 108a and 108b of H-bridge $508A_n$ must be changed from logic "0" and logic "1," respectively, to logic "1" and logic "0," respectively. Thus, a switching event of the H-bridge $508A_n$ also occurs, and a total of two switching events and six changes to the plurality of sets of four gate inputs (e.g., $1010a_1$ and $1010a_n$) are required to change to state 6. Accordingly, the decoder 1008 will choose to change the plurality of sets of four gate inputs (e.g., $1010a_1$ and $1010a_n$) to, for example, state 0 instead of state 6.

Although the decoder 1008 is described as including a programmed processor 1011 and memory 1013 for storing the look-up table 1015 accessed by the processor 1011, the decoder 1008 may be implemented through hardware alone (e.g., an ASIC chip) or through a combination of hardware and software.

In one implementation, the decoder 1008 also may select a combination of gate inputs $1010a_1$-$1010a_n$, $1010b_1$-$1010b_n$, and $1010c_1$-$1010c_n$ from redundant combinations such that each of the H-bridges in the respective cascaded group of H-bridges $508A_1$-$508A_n$, $508B_1$-$508B_n$, or $508C_1$-$508C_n$ has equal average switching and conduction losses and such that each of the respective cascaded group of H-bridges $508A_1$-$508A_n$, $508B_1$-$508B_n$, or $508C_1$-$508C_n$ draws equal power from the respective secondary winding circuits $124A_1$-$124A_n$, $124B_1$-$124B_n$, or $124C_1$-$124C_n$ of the input transformer 102. For example, in one implementation in which three H-bridges $508A_1$, $508A_2$, and $508A_n$ are cascaded together to collectively generate a single-phase output signal on the phase output line 502A, and assuming the drive-state output 1007 corresponds to a predetermined voltage level equal to the supply voltage to the H-bridges $508A_1$, $508A_2$, and $508A_n$, the decoder may select a redundant state or combination of gate inputs $1010a_1$, $1010a_2$, and $1010a_n$ where the first H-bridge $508A_1$ is switched to output a positive supply voltage, the second H-bridge $508A_2$ is switched to output a negative supply voltage that negates the output of the first H-bridge $508A_1$, and the third H-bridge $508A_n$ is switched to also output a positive supply voltage. In this exemplary implementation, each of the three H-bridges $508A_1$, $508A_2$, and $508A_n$ draws power equally from the secondary winding circuits $124A_1$, $124A_2$, and $124A_n$ rather than having only one of the three H-bridges $508A_1$, $508A_2$, and $508A_n$ provide the required output voltage.

In another embodiment which further prevents unnecessary switching of the H-bridges $508A_1$-$508A_n$, $508B_1$-$508B_n$, or $508C_1$-$508C_n$, the decoder 1008 may employ predictive modeling techniques to generate the plurality of sets of four gate inputs $1010a_1$-$1010a_n$, $1010b_1$-$1010b_n$, and $1010c_1$-$1010c_n$ based on the drive-state output 1007 from the hysteretic comparator 1006, the last state of the H-bridges $508A_1$-$508A_n$, $508B_1$-$508B_n$, or $508C_1$-$508C_n$, and the expected future states of the H-bridges $508A_1$-$508A_n$, $508B_1$-$508B_n$, or $508C_1$-$508C_n$ as determined based on, for example, the waveform of the phase current reference 518a, 518b, or 518c.

Continuing with FIG. 10, as with the values of the modulated phase current errors $611_1$-$611_n$ and the values of the modulated inverse phase current errors $613_1$-$613_n$ received by the first hysteretic comparators $614_1$-$614_n$ and $616_1$-$616_n$ of the hysteretic controller 504, the value of the regulated phase current error 1005 (and the corresponding value of the phase current error 1003) typically exceeds each of the predetermined current ranges or hysteresis bands (e.g., +/−h, +/−2 h, ... ) less frequently at the low slew rate portions (such as the sinusoidal peaks) of the waveform of the phase current reference 518a, 518b, or 518c and the voltage waveform of the single-phase output signal as shown, for example, in FIG. 8. This behavior occurs because the low slew rate portions of the waveform of the respective phase current reference 518a, 518b, or 518c are those portions at which the phase current reference 518a, 518b, or 518c, on which the value of the regulated phase current error 1005 ultimately depends, changes more slowly. As with the values of the modulated phase current errors $611_1$-$611_n$ and the values of the modulated inverse phase current errors $613_1$-$613_n$, the converse is also true. Namely, the value of the regulated phase current error 1005 typically exceeds each of the predetermined current ranges more frequently at the high slew rate portions (such as the zero-crossings) of the waveform of the respective phase current reference 518a, 518b, or 518c and the voltage waveform of the single-phase output signal as shown, for example, in FIG. 8. Moreover, this behavior also occurs because at the low slew rate portions of the waveform of the respective phase current reference 518a, 518b, or 518c, the current value of the single-phase output signal on the respective phase output line 502A, 502B, or 502C—on which the value of the regulated phase current error 1005 ultimately depends—changes less rapidly. Conversely, at the high slew rate portions of the waveform of the respective phase current reference 518a, 518b, or 518c, the current value of the single-phase output signal on the respective phase output line 502A, 502B, or 502C changes more rapidly, thus further contributing to the above-described behavior.

In view of the above-described behavior, the hysteretic non-deterministic control scheme described and implemented by the multi-level hysteretic controller 902 produces the same desired increases and decreases in the frequency of the switching events of H-bridges $508A_1$-$508A_n$, $508B_1$-$508B_n$, or $508C_1$-$508C_n$ as does the hysteretic non-deterministic control scheme described and implemented by the hysteretic controller 504. Because a switching event or events occurs when the regulated phase current error 1005 changes from being within any one (e.g., +/−2 h) of the predetermined current ranges (e.g., +/−h, +/−2 h, +/−3 h and +/−4 h) to being outside of that predetermined current range, the use of multiple predetermined current ranges allows the requisite effective switching rate of the corresponding group of cascaded H-bridges $508A_1$-$508A_n$, $508B_1$-$508B_n$, or $508C_1$-$508C_n$ to be achieved.

Moreover, as with the hysteretic controller 504, by appropriately sizing the predetermined current ranges to introduce an appropriate degree of hysteresis in the phase current error 1003 (reflecting the hysteresis in the switching of the respective H-bridges $508A_1$-$508A_n$, $508B_1$-$508B_n$, or $508C_1$-$508C_n$), this requisite effective switching rate can be achieved without causing excessive switching of the corresponding group of cascaded H-bridges $508A_1$-$508A_n$, $508B_1$-$508B_n$, or $508C_1$-$508C_n$. Specifically, in one implementation, the size of the largest predetermined current range, which includes all other predetermined current ranges as discussed above, is proportional or equal to the amplitude of the waveform of the respective phase current reference 518a, 518b, or 518c.

Continuing with FIG. 10, each switching event of one of the cascaded H-bridges $508A_1$-$508A_n$, $508B_1$-$508B_n$, or $508C_1$-$508C_n$ (e.g., $508A_1$), under the control of the multi-level hysteretic comparator 1006 of the multi-level hysteretic controller 902, allows the corresponding single-phase output signal on the respective phase output line (e.g., 502A) to track the corresponding phase current reference 518a, 518b, or 518c for similar reasons as discussed above with respect to the voltage drive system 500.

For example, this tracking occurs because each switching event, under the control of the multi-level hysteretic comparator 1006 of the multi-level hysteretic controller 902, causes the corresponding single-phase output signal collectively generated on the respective phase output line (e.g., 502A) by the one H-bridge (e.g., $508A_1$) and the other H-bridges (e.g., $508A_2$-$508A_n$) with which the one H-bridge is cascaded to decrease in voltage, such that the corresponding single-phase output signal is equal in voltage to the one predetermined voltage level to which the changed drive-state output 1007 corresponds, when the regulated phase current error 1005 changes from being within one of the plurality of predetermined current ranges to being greater than the predetermined upper current limit of that predetermined current range (e.g., due to an decrease in voltage of the phase current reference 518a, 518b, or 518c). As discussed above with respect to the voltage drive system 500, the multi-level hysteretic controller 902 causes the group of H-bridges (e.g., $508A_1$-$508A_n$) to switch to outputting a lower voltage corresponding to an increase in the phase current error 1003 above the respective predetermined upper current limit of that predetermined current range, which is in turn caused by a decrease in the corresponding phase current reference 518a, 518b, or 518c. Thus, the multi-level hysteretic controller 902 effectively causes the decrease in voltage of the corresponding single-phase output signal on the respective phase output line 502A, 502B or 502C to track the decrease in the corresponding phase current reference 518a, 518b, or 518c.

Conversely, each switching event, under the control of the multi-level hysteretic comparator 1006 of the multi-level hysteretic controller 902, causes the corresponding single-phase output signal collectively generated on the respective phase output line (e.g., 502A) by the one H-bridge (e.g., $508A_1$) and the other H-bridges (e.g., $508A_2$-$508A_n$) with which the one H-bridge is cascaded to increase in voltage, such that the corresponding single-phase output signal is equal in voltage to the one predetermined voltage level to which the changed drive-state output 1007 corresponds, when the regulated phase current error 1005 changes from being within one of the plurality of predetermined current ranges to being less than the predetermined lower current limit of that predetermined current range. As discussed above with respect to the voltage drive system 500, the multi-level hysteretic controller 902 causes the group of H-bridges (e.g., $508A_1$-$508A_n$) to switch to outputting a higher voltage corresponding to a decrease in the phase current error 1003 below the respective predetermined lower current limit of that predetermined current range, which is in turn caused by an increase in the corresponding phase current reference 518a, 518b, or 518c). Thus, the multi-level hysteretic controller 902 effectively causes the increase in voltage of the corresponding single-phase output signal on the respective phase output line 502A, 502B or 502C to track the increase in the corresponding phase current reference 518a, 518b, or 518c.

As will be further recognized by one of ordinary skill in the art upon review of the present application, the multi-level hysteretic comparator 1006 of the multi-level hysteretic controller 902 controls the switching events of the respective H-bridges $508A_1$-$508A_n$, $508B_1$-$508B_n$, or $508C_1$-$508C_n$ such that the value of the regulated phase current error 1005 (and the value of the phase current error 1003) is forced to about zero amperes (or to the center of each of the plurality of predetermined current ranges) upon any fluctuation in the regulated phase current error 1005 (and thus in the phase current error 1003). This result occurs because, as discussed above, the multi-level hysteretic comparator 1006 changes the drive-state output 1007 such that the voltage between the output terminals 212 and 214 of at least one of the cascaded H-bridges (e.g., $508A_1$-$508A_n$) decreases when the regulated phase current error 1005 received by the multi-level hysteretic comparator 1006 changes from being within one of the plurality of predetermined current ranges to being greater than the predetermined upper current limit of that predetermined current range. Because the voltage between the output terminals 212 and 214 of at least one of the cascaded H-bridges (e.g., $508A_1$-$508A_n$) decreases, the voltage of the single-phase output signal on the respective phase output line 502A, 502B, or 502C decreases. Consequently, the corresponding phase current feedback 520a, 520b, or 520c decreases, which in turn causes the phase current error 1003 and thus the regulated phase current error 1005 received by the multi-level hysteretic comparator 1006 to decrease relative to the respective phase reference 518a, 518b or 518c, thereby correcting the prior positive increase in the regulated phase current error 1005 received by the multi-level hysteretic comparator 1006. Specifically, the corresponding current feedback circuit 506A, 506B, or 506C may be implemented such that the decrease in the corresponding phase current feedback 520a, 520b, or 520c forces the regulated phase current error 1005 back to about zero (or to the center of the predetermined range).

Conversely, as discussed above, the multi-level hysteretic comparator 1006 of the multi-level hysteretic controller 902 changes the drive-state output 1007 such that the voltage between the output terminals 212 and 214 of at least one of the cascaded H-bridges (e.g., $508A_1$-$508A_n$) increases when the regulated phase current error 1005 received by the multi-level hysteretic comparator 1006 changes from being within one of the plurality of predetermined current ranges to being less than the predetermined lower current limit of that predetermined current range. Because the voltage between the output terminals 212 and 214 of at least one of the cascaded H-bridges (e.g., $508A_1$-$508A_n$) increases, the voltage of the single-phase output signal on the respective phase output line 502A, 502B, or 502C increases. Consequently, the corresponding phase current feedback 520a, 520b, or 520c increases, which in turn causes the phase current error 1003 and thus the regulated phase current error 1005 received by the multi-level hysteretic comparator 1006 to decrease relative to the respective phase reference 518a, 518b or 518c, thereby correcting the prior negative increase in the regulated phase current error 1005 received by the multi-level hysteretic comparator 1006. Specifically, the corresponding current feedback circuit 506A, 506B, or 506C may be implemented such that the increase in the corresponding phase current feedback 520a, 520b, or 520c forces the regulated phase current error 1005 back to about zero (or to the center of the predetermined range).

Because the value of the regulated phase current error 1005 is forced to about zero amperes (or to the center of each of the plurality of predetermined current ranges), the fluctuation of the regulated phase current error 1005 from the plurality of predetermined current ranges may continue, thereby continuing to cause the switching events of the H-bridges $508A_1$-$508A_n$, $508B_1$-$508B_n$, or $508C_1$-$508C_n$ under the control of the hysteretic controller 902 in the manner described above.

Figure 12:
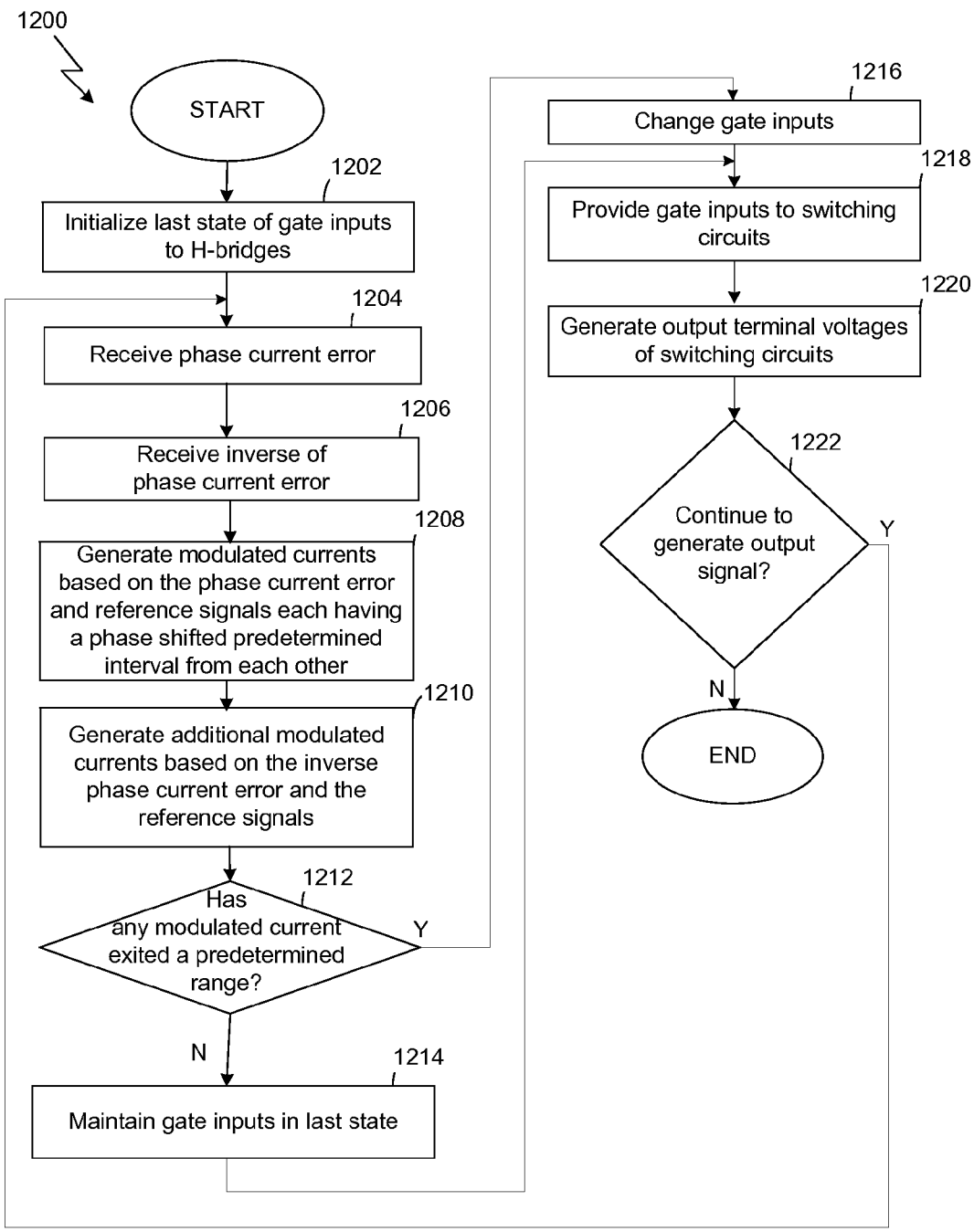
FIG. 12 is a flow chart illustrating an exemplary method in the voltage drive system of FIG. 5 for generating a single-phase output signal in accordance with the present invention.

FIG. 12 is a flow chart illustrating an exemplary process 1200 performed in the voltage drive system 500 of FIG. 5 to control a plurality of switching circuits (e.g., H-bridges $508A_1$-$508A_n$, H-bridges $508B_1$-$508B_n$ and H-bridges $508C_1$-$508C_n$) to generate one or more single-phase output signals, in accordance with the present invention, to drive a variable speed motor or other load requiring single or multi-phase, medium voltage input power. Initially, each of the hysteretic comparators $614_1$-$614_n$ and $616_1$-$616_n$, employed in the hysteretic controller 504 may initialize the last state 710 of the four gate inputs (e.g., $522a_{1-1}$-$522a_{1-4}$ or $522n_{1-1}$-$522n_{1-4}$ in FIG. 6) provided by the respective hysteretic comparator $614_1$, $616_1$, $614_n$ or $616_n$ to the respective switching circuit or H-bridge (step 1202). This step may be omitted from the process 1200 if each of the hysteretic comparators $614_1$-$614_n$ and $616_1$-$616_n$ generate respective gate inputs (e.g., $522a_{1-1}$-$522a_{1-4}$ or $522n_{1-1}$-$522n_{1-4}$) based on whether the regulated phase current error 1005 (or the phase current error 1003) received by the respective hysteretic comparator is within the predetermined current range or hysteresis band (e.g., +/−h) without regard to the last state of the gate inputs.

Next, as described with respect to FIG. 6, each of the hysteretic modulators $608_1$-$608_n$ employed in the hysteretic controller 504 receives a phase current error 603 or a regulated phase current error 605 (step 1204). In addition, each of the hysteretic modulators $608_1$-$608_n$ employed in the hysteretic controller 504 receives an inverse 607 of the phase current error 603 or a regulated phase current error 605 (step 1206).

A first of the hysteretic modulators (e.g., $608_1$) then generates a first modulated phase current error (e.g., $611_1$) based on the received phase current error 603 or regulated phase current error 605 and a reference or triangular signal $619_1$ having a first phase (e.g., phase=0); a second of the hysteretic modulators (e.g., $608_n$) also generates a second modulated phase current error (e.g., $611_n$) based on the same received phase current error 603 and a reference or triangular signal $619_n$ having a second phase offset from the first phase by a predetermined fraction of each reference signal's cycle or frequency (e.g., second phase=(n−1)(n/180)); and so on until each of the hysteretic modulators $608_1$-$608_n$ generates a modulated phase current error $611_1$ or $611_n$ based on the received phase current error 603 and a corresponding reference signal $619_1$ or $619_n$ having a respective phase such that each of the modulated phase current errors $611_1$-$611_n$ is a phase-shifted version of each of the other modulated phase current errors $611_1$-$611_n$ (step 1208). In one implementation, each of the reference signals $619_1$-$619_n$ is a zero-average signal, has a common amplitude, and is periodic with a common frequency.

Next, each of the hysteretic modulators $608_1$-$608_n$ generates a respective modulated inverse phase current error $613_1$ or $613_n$ based on a difference between the inverse regulated phase current error 607 and a respective reference signal $619_1$ or $619_n$ (step 1210). Thus, each of the hysteretic modulators $608_1$-$608_n$ also generates a modulated phase current errors $613_1$-$613_n$ that is a phase-shifted version of each of the other modulated inverse phase current errors.

Each of the hysteretic comparators $614_1$-$614_n$ and $616_1$-$616_n$ employed by a respective hysteretic modulator $608_1$-$608_n$ then determines whether the modulated phase current error or the modulated inverse phase current error (e.g., $613_1$ or $613_n$) input to the respective comparator $614_1$, $616_1$, $614_n$ or $616_n$ has, since the most recent state of the gate inputs was initialized, exited a predetermined current range (e.g., +/−h) (step 1212). Since each of the reference signals $619_1$ or $619_n$ are a phase-shifted version of each other and are, thus, separated by a respective time interval (e.g., corresponding to a phase offset of n/180), each of the hysteretic comparators $614_1$-$614_n$ and $616_1$-$616_n$ determines (at a respective time interval associated with the phase of the first reference signal $619_1$) whether the respective modulated phase current error (e.g., $611_1$ or $611_n$) or the modulated inverse phase current error (e.g., $613_1$ or $613_n$) has changed from being within the predetermined current range (e.g., +/−h) to being outside of the predetermined current range. If such a change has not occurred, either because the respective modulated phase current error or modulated inverse phase current error is within the predetermined current range at the time the determination is made or because the respective modulated phase current error or modulated inverse phase current error is outside of the predetermined current range and was outside of the predetermined current range at the time the most recent state of the gate inputs was initialized, processing may continue at step 1214. If such a change has occurred, processing may continue at step 1218.

In the event that processing continues at step 1214, each of the hysteretic comparators $614_1$-$614_n$ and $616_1$-$616_n$ that has determined that the respective modulated phase current error (e.g., $611_1$ or $611_n$) or the respective modulated inverse phase current error (e.g., $613_1$ or $613_n$) has not changed from being within the predetermined current range (e.g., +/−h) to being outside of the predetermined current range will then maintain its respective gate inputs (e.g., gate inputs $522a_{1-1}$ and $522a_{1-2}$ for comparator $614_1$ and gate inputs $522a_{1-3}$ and $522a_{1-4}$ for comparator $614_n$) will be maintained in their last state before continuing processing at step 1216.

In the event that processing continues at step 1216, each of the hysteretic comparators $614_1$-$614_n$ and $616_1$-$616_n$ that has determined that the respective modulated phase current error (e.g., $611_1$ or $611_n$) or the respective modulated inverse phase current error (e.g., $613_1$ or $613_n$) has changed from being within the predetermined current range (e.g., +/−h) to being outside of the predetermined current range will then change its respective gate inputs (e.g., gate inputs $522a_{1-1}$ and $522a_{1-2}$ for comparator $614_1$ and gate inputs $522a_{1-3}$ and $522a_{1-4}$ for comparator $614_n$) will be changed from their last state (i.e., corresponding to a first voltage level output of the H-bridge to which the gate inputs are connected) to a next state corresponding to a second voltage level output of the H-bridge to which the gate inputs are connected before continuing processing at step 1216. The generation of the gate inputs based on the respective one of the modulated phase current errors or modulated inverse phase current errors is described above with respect to FIG. 6. Changing these gate inputs effectively causes a switching event of one of the plurality of switching circuits which receives the gate inputs (e.g., one of H-bridges in the respective group of cascaded H-bridges $508A_1$-$508A_n$, H-bridges $508B_1$-$508B_n$ or H-bridges $508C_1$-$508C_n$). The switching event causes the single-phase output signal generated by the cascaded switching circuits or H-bridges to be equal in voltage to a predetermined voltage level. As further discussed above with respect to FIG. 6, the switching event causes the single-phase output signal to decrease in voltage when the respective one of the modulated phase current errors or modulated inverse phase current errors changes from being within the predetermined current range to being greater than the predetermined upper current limit. When the respective one of the modulated phase current errors or modulated inverse phase current errors changes from being within the predetermined current range to being less than the predetermined lower current limit, the switching event causes the single-phase output signal to increase in voltage. Moreover, because the plurality of signals shares the characteristics of the reference signals $619_1$-$619_n$ discussed with respect to FIG. 6, a first switching event of a first of the switching circuits will be separated from a second switching event of a second of the switching circuits by a predetermined time interval. The time interval increases as the common amplitude of the reference signals $619_1$-$619_n$ increases.

As still further discussed above with respect to FIG. 6, the control or modulation scheme implemented by the hysteretic controller 504 (and the comparators $614_1$-$614_n$ and $616_1$-$616_n$ employed therein) has the desired result of increasing the frequency of switching events at times corresponding to the high slew rate portions of the voltage waveform of the single-phase output signal by the group of cascaded H-bridges controlled by the hysteretic controller 504 and decreasing the frequency of switching events at times corresponding to the low slew rate portions of the voltage waveform of the same single-phase output signal.

Next, at step 1218, each of the hysteretic comparators $614_1$-$614_n$ and $616_1$-$616_n$ provides its gate inputs to the corresponding switching circuit (e.g., one of H-bridges in the respective group of cascaded H-bridges $508A_1$-$508A_n$, H-bridges $508B_1$-$508B_n$ or H-bridges $508C_1$-$508C_n$). For example, the modulated phase current error and the modulated inverse phase current error generated based on the first reference signal $619_1$ are each used to generate two gate inputs (e.g., gate inputs $522a_{1-1}$ and $522a_{1-2}$ for comparator $614_1$ and gate inputs $522a_{1-3}$ an $522a_{1-4}$ for comparator $614_n$) as discussed herein. The four gate inputs (e.g., $522a_{1-1}$, $522a_{1-2}$, $522a_{1-3}$ and $522a_{1-4}$) obtained from this modulated phase current error $611_1$ and modulated inverse phase current error $613_1$ are provided to a first switching circuit $508A_1$ as illustrated in FIGS. 5 and 6. Similarly, four gate inputs (e.g., $522n_{1-1}$, $522n_{1-2}$, $522n_{1-3}$ and $522n_{1-4}$) are obtained from the modulated phase current error $611_n$ and the modulated inverse phase current error $613_n$ generated based on the second reference signal $619_n$. These four gate inputs are provided to a second switching circuit $508A_n$ that is cascaded with the first switching circuit $508A_1$ to collectively generate the respective single-phase output signal on the phase output line 502A.

Figure 1:
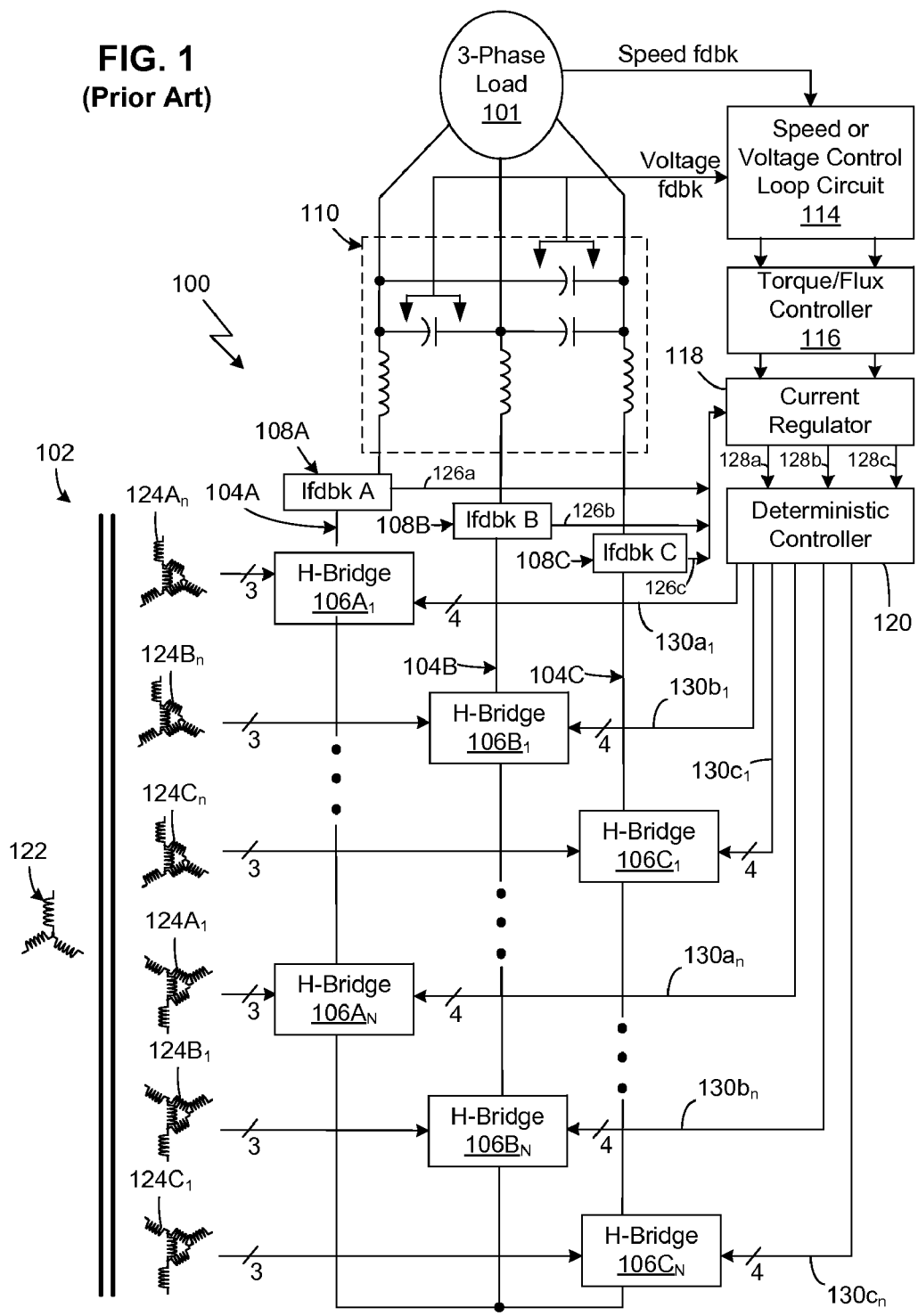
FIG. 1 is a block diagram of a conventional voltage drive system employing H-bridges to drive a medium voltage load, such as a variable speed motor.

When the changed gate inputs are provided by the hysteretic comparators employed in the hysteretic controller 504 to the corresponding switching circuits (e.g., a corresponding group of cascaded H-bridges $508A_1$-$508A_n$, H-bridges $508B_1$-$508B_n$ or H-bridges $508C_1$-$508C_n$), each of the switching circuits generates an output terminal voltage (e.g., the voltage between the output terminals 212 and 214 if each of the plurality of switching circuits is implemented consistent with the H-bridge 200 in FIG. 1) based on the four gate inputs received by the respective switching circuit (step 1220). As previously discussed herein, the switching circuits (H-bridges $508A_1$-$508A_n$, H-bridges $508B_1$-$508B_n$ or H-bridges $508C_1$-$508C_n$) are cascaded such that the switching circuits collectively generate the single-phase output signal to the load.

Next, the hysteretic controller 504 determines whether to continue to generate the single-phase output signal (step 1222). In one implementation, this determination is made based on whether an external power switch (not shown in the drawings) is in an ON state or an OFF state. If the hysteretic controller 504 determines not to continue to generate the single-phase output signal, the process ends. If the hysteretic controller 504 determines that the single-phase output signal is to be continued to be generated, processing may continue at step 1204.

Figure 13:
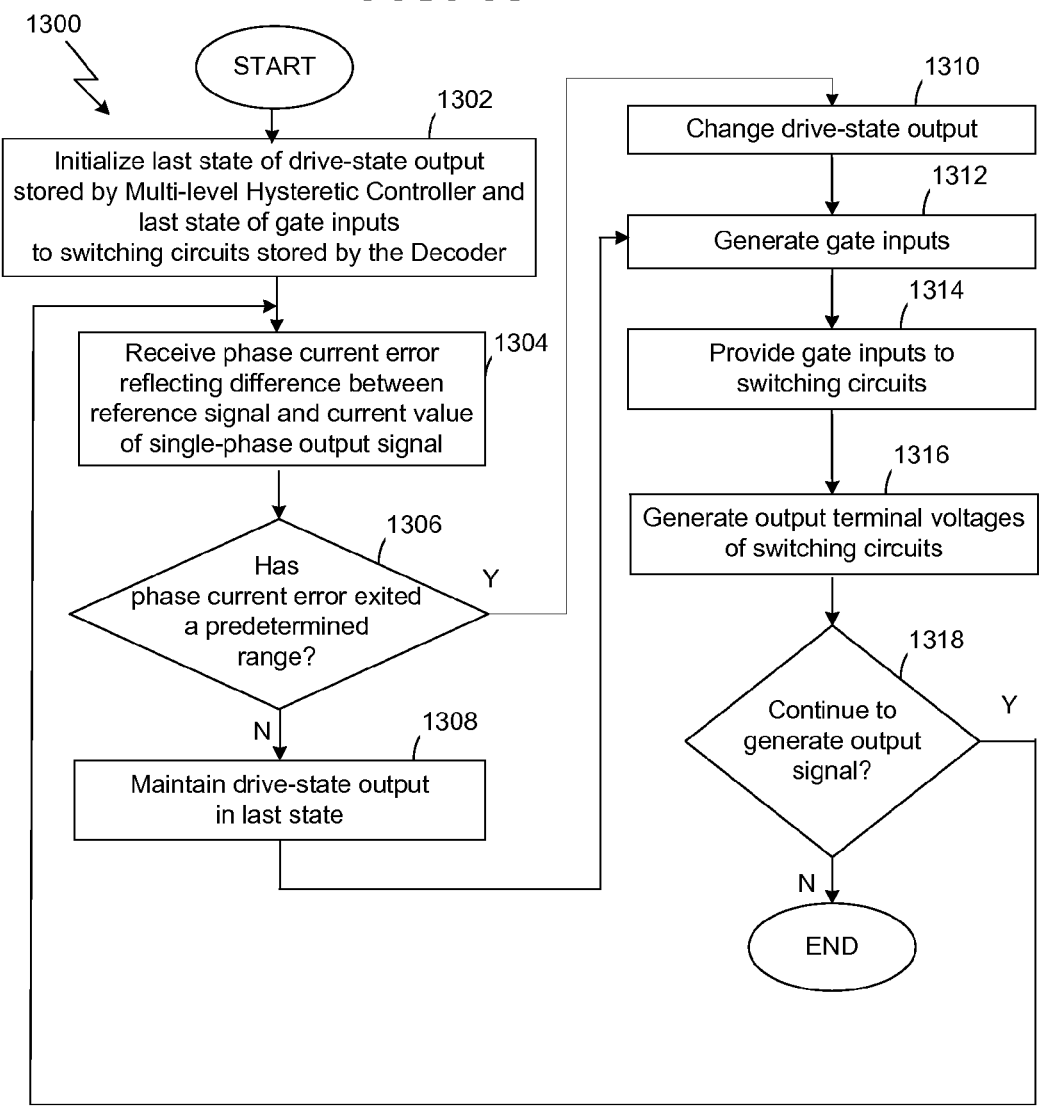
FIG. 13 is a flow chart illustrating an exemplary method in the voltage drive system of FIG. 9 for generating a single-phase output signal in accordance with the present invention.

FIG. 13 is a flow chart illustrating an exemplary process 1300 performed in the voltage drive system 900 of FIG. 9 to control a plurality of switching circuits (e.g., H-bridges 508A$_1$-508A$_n$, H-bridges 508B$_1$-508B$_n$ and H-bridges 508C$_1$-508C$_n$) to generate one or more single-phase output signals to drive a variable speed motor or other load requiring phased, medium voltage input power in accordance with the present invention. Initially, in step 1302, the multi-level hysteretic comparator 1006 employed in the multi-level hysteretic non-deterministic controller 902 initializes the last state of the drive-state output 1007 and the decoder 1008 (also employed in the controller 902) initializes the last state of the gate inputs provided to each of a plurality of switching circuits (e.g., H-bridges such as the H-bridge 200 in FIG. 1).

Next, the multi-level hysteretic comparator 1006 receives a phase current error 1003 or a regulated phase current error 1005 (step 1304).

In step 1306, the multi-level hysteretic comparator 1006 (via the state machine 1104) then determines whether a phase current error 1003 or a regulated phase current error 1005 has, since the last state of the drive-state output 1007 was initialized in step 1302, exited one of a plurality of predetermined current ranges (e.g., +/−h, +/−2 h, +/−3 h and +/−4 h). As previously described, the multi-level hysteretic comparator 1006 is operatively configured to determine whether the phase current error 1003 or the regulated phase current error 1005 has changed from being within one (e.g., +/−2 h) of the plurality of predetermined current ranges (+/−h, +/−2 h, +/−3 h or +/−4 h) to being outside of the one predetermined current range (e.g., +/−2 h). The plurality of predetermined current ranges may be, for example, the plurality of predetermined current ranges discussed with respect to FIG. 10. If such a change in the phase current error 1003 or the regulated phase current error 1005 has not occurred, processing may continue at step 1308. If such a change in the phase current error 1003 or the regulated phase current error 1005 has occurred, processing may continue at step 1310.

In the event that processing continues at step 1308, the multi-level hysteretic comparator 1006 maintains the drive-state output 1007 to the decoder 1008 in its last state before continuing processing at step 1312. As discussed herein, the drive-state output 1007 corresponds to one of a plurality of predetermined voltage levels that may be generated by the group of cascaded switching circuits or H-bridges used to collectively generate the single-phase output signal on the corresponding phase output line 502A, 502B, or 502C of the voltage drive system 900.

In the event that processing continues at step 1310, the multi-level hysteretic comparator 1006 will change the drive-state output 1007 to correspond to a new one of the plurality of predetermined voltage levels in the manner described with respect to FIG. 10 before continuing processing at step 1312.

At step 1312, the decoder 1008 generates the four gate inputs (e.g., 1010a$_{1-1}$-1010a$_{1-4}$ or 1010n$_{1-1}$-1010n$_{1-4}$) to each of the plurality of switching circuits (e.g., 506A$_1$-506A$_n$) based on the drive-state output 1007 from the multi-level hysteretic comparator 1006. In one implementation, the decoder 1008 generates the four gate inputs (e.g., 1010a$_{1-1}$-1010a$_{1-4}$ or 1010n$_{1-1}$-1010n$_{1-4}$) to each of the plurality of switching circuits (e.g., 506A$_1$-506A$_n$) based on the drive-state output 1007 from the multi-level hysteretic comparator 1006 and the last state of the gate inputs to the switching circuits (e.g., 506A$_1$-506A$_n$).

Next, the decoder 1008 provides the gate inputs (e.g., 1010a$_{1-1}$-1010a$_{1-4}$ through 1010n$_{1-1}$-1010n$_{1-4}$) to the switching circuits (e.g., 506A$_1$-506A$_n$) (step 1314). The decoder 1008 generates the gate inputs 1010a$_{1-1}$-1010a$_{1-4}$ through 1010n$_{1-1}$-1010n$_{1-4}$ based on the drive-state output 1007 so that the switching circuits 506A$_1$-506A$_n$ collectively generate the single-phase output signal to have a voltage equal to the one predetermined voltage level to which the drive-state output 1007 corresponds. Thus, and as discussed herein, changing the drive-state output 1007 in step 1310 effectively causes, via the decoder 1008, a switching event of the plurality of switching circuits 506A$_1$-506A$_n$. As further discussed with respect to FIG. 10, the switching event causes the single-phase output signal to decrease in voltage when the phase current error 1003 changes from being within one of the predetermined current ranges to being greater than a predetermined higher current limit of that predetermined current range. When the regulated phase current error changes from being within one of the predetermined current ranges to being less than a predetermined lower current limit of that predetermined current range, the switching event causes the single-phase output signal to increase in voltage. In both instances, the phase current error 1003 is subsequently driven back within that predetermined current range and towards zero voltage.

As still further discussed above with respect to FIG. 10, this control scheme implemented by the multi-level hysteretic controller 902 (and the comparator 1006 and decoder 1008 employed therein) has the desired result of increasing the frequency of switching events at times corresponding to the high slew rate portions of the voltage waveform of the single-phase output signal and decreasing the frequency of switching events at times corresponding to the low slew rate portions of the voltage waveform of the single-phase output signal as depicted in FIG. 8.

Next, each of the plurality of switching circuits 506A$_1$-506A$_n$ generates an output terminal voltage (e.g., the voltage between the output terminals 212 and 214 if each of the plurality of switching circuits is implemented consistent with the H-bridge 200 in FIG. 1) based on the four gate inputs received by respective the switching circuit (step 1380). The plurality of switching circuits is cascaded such that the switching circuits of the plurality of switching circuits collectively generate the single-phase output signal to the load. More particularly, the switching circuits are cascaded such that the voltage of the singe-phase output signal is equal to the sum of the output terminal voltages of each of the plurality of switching circuits. In one implementation, the plurality of switching circuits may be cascaded in the same manner as the H-bridges 106A$_1$-106A$_n$, 106B$_1$-106B$_n$, and 106C$_1$-106C$_n$ in FIG. 2.

Next, the multi-level hysteretic controller 902 determines whether to continue to generate the single-phase output signal (step 1318). In one implementation, this determination is made based on whether an external power switch (not shown in the drawings) is in an ON state or an OFF state. If the multi-level hysteretic controller 902 determines not to continue to generate the single-phase output signal, processing ends. If the multi-level hysteretic controller 902 determines that the single-phase output signal is to be continued to be generated, processing continues at step 1304.

In view of the foregoing teaching, the present invention provides numerous advantages over known systems, articles of manufacture, and methods. For example, one or more embodiments of the present invention remedy the deficiencies of conventional voltage drive systems employing deterministic control. Such systems suffer from a lack of bandwidth when used to synthesize high-frequency waveforms. As a result, the waveforms produced by such conventional voltage drive systems have an unduly high amount of distortion, especially at their peaks and zero crossings. Such waveforms also include clearly-defined tones in the spectra of the voltage and current. Moreover, because of needlessly high switching frequencies at times of high current flow through such conventional voltage drive systems, switching losses are needlessly high. One or more embodiments of the present invention, however, remedy the distortion, tones, and high switching losses of deterministic control systems by providing for appropriate timing of increases and decreases in the switching frequency of the respective single-phase output signal.

Moreover, because the switching frequency is increased at certain times and decreased at others, the same average switching frequency is obtained by voltage drive systems consistent with the present invention as compared to a conventional system employing deterministic control. The hysteretic controller 504 and the multi-level hysteretic controller 902 also provide robust current limit capability, improved performance with multiple paralleled systems, inherent ac filter damping because the inductors of the ac filter 509 appear as current sources, improved overall system stability, improved current control for permanent magnet motors, improved harmonic injection and regulation performance, and improved performance at zero hertz. Yet another benefit provided by one or more embodiments of the present invention is inherent regulation of zero sequence current. Because current regulation is performed completely in the a, b, c reference frame, independent phase current regulation of both differential and common mode components is obtained. This feature has value in cases where voltage drive outputs are directly paralleled without transformer isolation or where a finite impedance exists between the source and load neutrals.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

What is claimed:

1. A voltage drive system having a single-phase output signal to drive a load, the voltage drive system comprising:
a plurality of modulators and a plurality of switching circuits;
wherein,
a first of the modulators receives a phase current error reflecting a difference between a current reference and a current value of the single-phase output signal, and generates a first gate input based on the phase current error, the first modulator including a first signal generator generating a first reference signal having a first phase, and a first adder receiving the phase current error and the first reference signal;
a second of the modulators receives the phase current error and generates a second gate input based on the phase current error, the second modulator including a second signal generator generating a second reference signal having a second phase different from the first phase, and a second adder receiving the phase current error and the second reference signal;
a first of the switching circuits receives the first gate input and generates a first output terminal voltage based on the first gate input;
a second of the switching circuits receives the second gate input and generates a second output terminal voltage based on the second gate input, and
wherein,
the first adder generates a first modulated phase current error based on the phase current error and the first reference signal;
the second adder generates a second modulated phase current error based on the phase current error and the second reference signal;
the first modulator changes the first gate input from a first voltage level to a second voltage level to effectively cause a first switching event of the first switching circuit when the first modulated phase current error changes from being within a predetermined current range to being outside of the predetermined current range;
the second modulator changes the second gate input from a third voltage level to a fourth voltage level to effectively cause a second switching event of the second switching circuit when the second modulated phase current error changes from being within the predetermined current range to being outside of the predetermined current range;
the plurality of switching circuits is cascaded such that the switching circuits of the plurality of switching circuits collectively generate the single-phase output signal to the load, and
a voltage of the single-phase output signal is equal to a sum of an output terminal voltage of each of the plurality of switching circuits.

2. The voltage drive system of claim 1, wherein,
the first modulator further comprises a third adder configured to receive an inverse phase current error and generate a modulated inverse phase current error based on the inverse phase current error and the first reference signal,
the first modulator provides a third gate input to the first switching circuit based on the modulated inverse phase current error,
the first modulator changes the third gate input from a fifth voltage level to a sixth voltage level to effectively cause a third switching event of the first switching circuit when the modulated inverse phase current error changes from being within the predetermined current range to being outside of the predetermined current range.

3. The voltage drive system of claim 1, wherein the first switching event causes the single-phase output signal to be equal in voltage to a predetermined voltage level.

4. The voltage drive system of claim 1, wherein the predetermined current range is defined by a predetermined lower current limit and a predetermined upper current limit, and wherein the first switching event causes the single-phase output signal to decrease in voltage when the first modulated phase current error changes from being within the predetermined current range to being greater than the predetermined upper current limit.

5. The voltage drive system of claim 1, wherein the predetermined current range is defined by a predetermined lower current limit and a predetermined upper current limit, and wherein the first switching event causes the single-phase output signal to increase in voltage when the first modulated phase current error changes from being within the predetermined current range to being less than the predetermined lower current limit.

6. The voltage drive system of claim 1, wherein the predetermined current range is defined by a predetermined lower current limit and a predetermined upper current limit, and wherein the second switching event causes the single-phase output signal to decrease in voltage when the second modulated phase current error changes from being within the predetermined current range to being greater than the predetermined upper current limit.

7. The voltage drive system of claim 1, wherein the predetermined current range is defined by a predetermined lower current limit and a predetermined upper current limit, and wherein the second switching event causes the single-phase output signal to increase in voltage when the second modulated phase current error changes from being within the predetermined current range to being less than the predetermined lower current limit.

8. The voltage drive system of claim 1, wherein the first reference signal and the second reference signal are such that the first switching event and the second switching event are separated by a time interval.

9. The voltage drive system of claim 8, wherein each of the first reference signal and the second reference signal are characterized by a common amplitude, and wherein the time interval increases as the common amplitude increases.

10. A voltage drive system having a single-phase output signal to drive a load, the voltage drive system comprising:
   a multi-level comparator receiving a phase current error and generating a drive-state output corresponding to one of a plurality of predetermined voltage levels;
   a decoder receiving the drive-state output and generating a plurality of gate inputs based on the drive-state output; and
   a plurality of switching circuits, each of the switching circuits receiving a respective one of the gate inputs and generating a respective output terminal voltage based on the respective one gate input;
   wherein,
   the phase current error is based on a difference between a current reference and a current value of the single-phase output signal,
   the multi-level comparator changes the drive-state output to effectively cause a first switching event of the plurality of switching circuits when the phase current error changes from being within a first predetermined current range to being outside of the first predetermined current range,
   the multi-level comparator changes the drive-state output to effectively cause a second switching event of the plurality of switching circuits when the phase current error changes from being within a second predetermined current range to being outside of the second predetermined current range,
   the plurality of switching circuits is cascaded such that the switching circuits of the plurality of switching circuits collectively generate the single-phase output signal to the load, and
   a voltage of the single-phase output signal is equal to a sum of the respective output terminal voltages of the plurality of switching circuits.

11. The voltage drive system of claim 10, wherein the decoder generates the plurality of gate inputs based on the drive-state output so that the plurality of switching circuits collectively generates the single-phase output signal to have a voltage equal to the one predetermined voltage level.

12. The voltage drive system of claim 10, wherein the decoder generates the plurality of gate inputs based on the drive-state output and a most recent state of the plurality of switching circuits.

13. The voltage drive system of claim 10, wherein the second predetermined current range includes the first predetermined current range.

14. The voltage drive system of claim 10, wherein the first predetermined current range is defined by a first predetermined lower current limit and a first predetermined upper current limit, and wherein the first switching event causes the single-phase output signal to decrease in voltage when the phase current error changes from being within the first predetermined current range to being greater than the first predetermined upper current limit.

15. The voltage drive system of claim 10, wherein the first predetermined current range is defined by a first predetermined lower current limit and a first predetermined upper current limit, and wherein the first switching event causes the single-phase output signal to increase in voltage when the phase current error changes from being within the first predetermined current range to being less than the first predetermined lower current limit.

16. The voltage drive system of claim 10, wherein the second predetermined current range is defined by a second predetermined lower current limit and a second predetermined upper current limit, and wherein the second switching event causes the single-phase output signal to decrease in voltage when the phase current error changes from being within the second predetermined current range to being greater than the first predetermined upper current limit.

17. The voltage drive system of claim 10, wherein the second predetermined current range is defined by a second predetermined lower current limit and a second predetermined upper current limit, and wherein the second switching event causes the single-phase output signal to increase in voltage when the phase current error changes from being within the second predetermined current range to being less than the first predetermined lower current limit.

18. A method in a voltage drive system for controlling a plurality of switching circuits to generate a single-phase output signal to drive a load, the method comprising:
   receiving a phase current error reflecting a difference between a phase current reference signal and a phase feedback signal associated with the single-phase output signal;
   generating a first modulated phase current error based on the phase current error and a first reference signal having a first phase;
   generating a second modulated phase current error based on the phase current error and a second reference signal having a second phase different from the first phase;
   changing a first gate input operatively connected to a first of the switching circuits from a first voltage level to a second voltage level when the first modulated phase current error changes from being within a predetermined current range to being outside of the predetermined current range;
   changing a second gate input operatively connected to a second of the switching circuits from a third voltage level to a fourth voltage level when the second modulated phase current error changes from being within the predetermined current range to being outside of the predetermined current range; and
   generating an output terminal voltage for each of the plurality of switching circuits;

wherein, changing the first gate input effectively causes a first switching event of the first switching circuit, changing the second gate input effectively causes a second switching event of the second switching circuit, the switching circuits are cascaded such that the switching circuits collectively generate the single-phase output signal to the load, and a voltage of the single-phase output signal is equal to a sum of an output terminal voltage of each of the plurality of switching circuits.

19. The method of claim 18, wherein the first switching event causes the single-phase output signal to be equal in voltage to a predetermined voltage level.

20. The method of claim 18, wherein the predetermined current range is defined by a predetermined lower current limit and a predetermined upper current limit, and wherein the first switching event causes the single-phase output signal to decrease in voltage when the first modulated phase current error changes from being within the predetermined current range to being greater than the predetermined upper current limit.

21. The method of claim 18, wherein the predetermined current range is defined by a predetermined lower current limit and a predetermined upper current limit, and wherein the first switching event causes the single-phase output signal to increase in voltage when the first modulated phase current error changes from being within the predetermined current range to being less than the predetermined lower current limit.

22. The voltage drive system of claim 18, wherein the first reference signal and the second reference signal are such that the first switching event and the second switching event are separated by a time interval.

23. The voltage drive system of claim 22, wherein each of the first reference signal and the second reference signal are characterized by a common amplitude, and wherein the time interval increases as the common amplitude increases.

* * * * *